United States Patent
Xu et al.

(10) Patent No.: US 12,376,149 B2
(45) Date of Patent: Jul. 29, 2025

(54) DOWNLINK CONTROL INFORMATION (DCI) TRANSMISSION IN MULTIPLE LISTEN-BEFORE-TALK (LBT) BANDWIDTHS

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/758,626

(22) PCT Filed: Jan. 22, 2020

(86) PCT No.: PCT/CN2020/073730
§ 371 (c)(1),
(2) Date: Jul. 11, 2022

(87) PCT Pub. No.: WO2021/146986
PCT Pub. Date: Jul. 29, 2021

(65) Prior Publication Data
US 2023/0051760 A1    Feb. 16, 2023

(51) Int. Cl.
*H04W 74/0808* (2024.01)
(52) U.S. Cl.
CPC ............... *H04W 74/0808* (2013.01)
(58) Field of Classification Search
CPC ........ H04W 74/0808; H04W 74/0816
See application file for complete search history.

(56) References Cited

U.S. PATENT DOCUMENTS

| | | |
|---|---|---|
| 2017/0332358 A1 | 11/2017 | Park et al. |
| 2020/0021999 A1 | 1/2020 | Park et al. |
| (Continued) | | |

FOREIGN PATENT DOCUMENTS

| | | |
|---|---|---|
| CN | 107135490 A | 9/2017 |
| CN | 107769830 A | 3/2018 |
| CN | 110536447 A | 12/2019 |

OTHER PUBLICATIONS

Huawei, et al., "DL Channels and Signals in NR Unlicensed Band", 3GPP Draft, 3GPP TSG RAN WG1 Meeting #98bis, R1-1910043, 3rd Generation Partnership Project (3GPP), Mobile Competence Centre, 650, Route Des Lucioles, F-06921, Sophia-Antipolis, Cedex, France, vol. RAN WG1, No. Chongqing, China, Oct. 14, 2019-Oct. 20, 2019, Oct. 8, 2019 (Oct. 8, 2019), XP051809057, 17 pages, Retrieved from the Internet: URL:https://ftp.3gpp.org/tsg_ran/WG1_RL1/TSGR1_98b/Docs/R1-1910043.zip R1-1910043.docx.

(Continued)

*Primary Examiner* — John D Blanton
(74) *Attorney, Agent, or Firm* — Haynes and Boone LLP

(57) ABSTRACT

Wireless communications systems and methods related to wireless communications in a system are provided. A first wireless communication device may communicate with a second wireless communication device in a listen-before-talk (LBT) bandwidth of a set of LBT bandwidths, downlink control information (DCI). The DCI may indicate acquisition of a channel occupancy time (COT) in a fixed frame period (FFP) across the set of LBT bandwidths and/or a starting point of the FFP in the respective LBT bandwidth. The first wireless communication device may communicate with the second wireless communication device, a communication in at least one LBT bandwidth of the set of LBT bandwidths during the respective COT.

16 Claims, 12 Drawing Sheets

(56) References Cited

U.S. PATENT DOCUMENTS

| | | | |
|---|---|---|---|
| 2020/0146064 A1* | 5/2020 | Oh | H04W 74/0808 |
| 2020/0154475 A1* | 5/2020 | Pao | H04L 5/0094 |
| 2020/0228992 A1* | 7/2020 | Tsai | H04W 72/23 |
| 2020/0280971 A1* | 9/2020 | Moon | H04L 5/0053 |
| 2021/0385831 A1* | 12/2021 | Nogami | H04W 72/23 |
| 2021/0400719 A1* | 12/2021 | Oh | H04L 1/1614 |
| 2022/0174739 A1* | 6/2022 | Kwak | H04W 74/0816 |
| 2022/0264603 A1* | 8/2022 | Yang | H04W 72/23 |
| 2023/0051760 A1* | 2/2023 | Xu | H04W 74/0808 |

OTHER PUBLICATIONS

International Search Report and Written Opinion—PCT/CN2020/073730—ISAEPO—Oct. 27, 2020.

Ericsson: "DL Signals and Channels for NR-U", 3GPP TSG-RAN WG1 Meeting #98bis, R1-1912707, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, pp. 1-25, XP051823551, section 3.

Huawei, et al., "DL Channels and Signals in NR Unlicensed Band", 3GPP TSG RAN WG1 Meeting #99, R1-1911864, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 17 Pages, XP051823046, figures 1, 2, 3, 4, sections 3.2.1, 3.2.2, 3.2.3, 3.2.4, p. 6-p. 10.

Motorola Mobility, et al., "Feature Lead Summary #3 for NR-U DL Signals and Channels", 3GPP TSG RAN WG1#99, R1-1913501, 3rd Generation Partnership Project (3GPP), Mobile Competence Centre, 650, Route Des Lucioles, F-06921 Sophia-Antipolis Cedex, France, vol. RAN WG1, No. Reno, United States, Nov. 18, 2019-Nov. 22, 2019, Nov. 25, 2019, 36 Pages, XP051830779, sections 1, 2, 3, p. 1-p. 5.

Supplementary European Search Report—EP20916201—Search Authority—The Hague—Sep. 18, 2023.

ETRI: "DL Signals and Channels For NR-U", 3GPP TSG RAN WG1 #98bis, R1-1910995, Chongqing, China, Oct. 14, 2019-Oct. 20, 2019, pp. 1-6, Oct. 7, 2019.

* cited by examiner

DOWNLINK CONTROL INFORMATION (DCI) TRANSMISSION IN MULTIPLE LISTEN-BEFORE-TALK (LBT) BANDWIDTHS

CROSS-REFERENCE TO RELATED APPLICATIONS

The present application is a 35 U.S.C. 371 National Phase entry of Patent Cooperation Treaty (PCT) Application No. PCT/CN2020/073730, filed Jan. 22, 2020. The aforementioned application is hereby expressly incorporated herein by reference in its entirety.

TECHNICAL FIELD

This application relates to wireless communication systems, and more particularly to downlink control information (DCI) transmission in multiple listen-before-talk (LBT) bandwidths.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a transmitting node (e.g., a BS or a UE) may perform an LBT prior to transmitting a communication signal in an unlicensed frequency band. Two broad types of LBT schemes may include Load Based Equipment (LBE) and Frame Based Equipment (FBE). In the LBE approach, the channel sensing is performed at any time instant and random back-off is used if the channel is found busy. In FBE, channel sensing is performed at fixed time instants, and if the channel is busy, the wireless communication device (e.g., BS or UE) backs off for a fixed time period and senses the channel again after this period.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes, at a first wireless communication device: in each listen-before-talk (LBT) bandwidth of a plurality of LBT bandwidths, communicating downlink control information (DCI) with a second wireless communication device, the DCI indicating acquisition of a channel occupancy time (COT) in a fixed frame period (FFP) in the respective LBT bandwidth; and communicating a communication with the second wireless communication device in at least one LBT bandwidth of the plurality of LBT bandwidths during the respective COT.

In an aspect of the disclosure, a method of wireless communication includes, at a first wireless communication device: in a listen-before-talk (LBT) bandwidth of a plurality of LBT bandwidths, communicating downlink control information (DCI) with a second wireless communication device, the DCI indicating acquisition of a channel occupancy time (COT) in a fixed frame period (FFP) across the plurality of LBT bandwidths; and communicating a communication with the second wireless communication device in at least one LBT bandwidth of the plurality of LBT bandwidths during the respective COT.

In an aspect of the disclosure, a method of wireless communication includes, at a first wireless communication device: in at least one listen-before-talk (LBT) bandwidth of a plurality of LBT bandwidths, communicating downlink control information (DCI) with a second wireless communication device, the DCI indicating a starting point of a fixed frame period (FFP) in the respective LBT bandwidth; and communicating a communication with the second wireless communication device during the respective FFP in one or more LBT bandwidths of the at least one LBT bandwidth.

In an aspect of the disclosure, an apparatus includes a transceiver configured to: communicate, by a first wireless communication device with a second wireless communication device in each listen-before-talk (LBT) bandwidth of a plurality of LBT bandwidths, downlink control information (DCI) indicating acquisition of a channel occupancy time (COT) in a fixed frame period (FFP) in the respective LBT bandwidth; and communicate, by the first wireless communication device with the second wireless communication device, a communication in at least one LBT bandwidth of the plurality of LBT bandwidths during the respective COT.

In an aspect of the disclosure, an apparatus includes a transceiver configured to: communicate, by a first wireless communication device with a second wireless communication device in a listen-before-talk (LBT) bandwidth of a plurality of LBT bandwidths, downlink control information (DCI) indicating acquisition of a channel occupancy time (COT) in a fixed frame period (FFP) across the plurality of LBT bandwidths; and communicate, by the first wireless communication device with the second wireless communication device, a communication in at least one LBT bandwidth of the plurality of LBT bandwidths during the respective COT.

In an aspect of the disclosure, an apparatus includes a transceiver configured to: communicate, by a first wireless communication device with a second wireless communication device in at least one listen-before-talk (LBT) bandwidth of a plurality of LBT bandwidths, downlink control information (DCI) indicating a starting point of a fixed frame period (FFP) in the respective LBT bandwidth; and communicate, by the first wireless communication device with the second wireless communication device, a communication during the respective FFP in one or more LBT bandwidths of the at least one LBT bandwidth.

In an additional aspect of the disclosure, a computer-readable medium having program code recorded thereon, the program code includes code for causing a first wireless communication device to communicate with a second wireless communication device in each listen-before-talk (LBT) bandwidth of a plurality of LBT bandwidths, downlink control information (DCI) indicating acquisition of a channel occupancy time (COT) in a fixed frame period (FFP) in the respective LBT bandwidth; and code for causing the first wireless communication device to communicate with the second wireless communication device, a communication in at least one LBT bandwidth of the plurality of LBT bandwidths during the respective COT.

In an additional aspect of the disclosure, a computer-readable medium having program code recorded thereon, the program code includes code for causing a first wireless communication device to communicate with a second wireless communication device in a listen-before-talk (LBT) bandwidth of a plurality of LBT bandwidths, downlink control information (DCI) indicating acquisition of a channel occupancy time (COT) in a fixed frame period (FFP) across the plurality of LBT bandwidths; and code for causing the first wireless communication device to communicate with the second wireless communication device, a communication in at least one LBT bandwidth of the plurality of LBT bandwidths during the respective COT.

In an additional aspect of the disclosure, a computer-readable medium having program code recorded thereon, the program code includes code for causing a first wireless communication device to communicate with a second wireless communication device in at least one listen-before-talk (LBT) bandwidth of a plurality of LBT bandwidths, downlink control information (DCI) indicating a starting point of a fixed frame period (FFP) in the respective LBT bandwidth; and code for causing the first wireless communication device to communicate with the second wireless communication device, a communication during the respective FFP in one or more LBT bandwidths of the at least one LBT bandwidth.

In an additional aspect of the disclosure, an apparatus includes means for communicating with a second wireless communication device in each listen-before-talk (LBT) bandwidth of a plurality of LBT bandwidths, downlink control information (DCI) indicating acquisition by a first wireless communication device of a channel occupancy time (COT) in a fixed frame period (FFP) in the respective LBT bandwidth; and means for communicating with the second wireless communication device, a communication in at least one LBT bandwidth of the plurality of LBT bandwidths during the respective COT.

In an additional aspect of the disclosure, an apparatus includes means for communicating with a second wireless communication device in a listen-before-talk (LBT) bandwidth of a plurality of LBT bandwidths, downlink control information (DCI) indicating acquisition by a first wireless communication device of a channel occupancy time (COT) in a fixed frame period (FFP) across the plurality of LBT bandwidths; and means for communicating with the second wireless communication device, a communication in at least one LBT bandwidth of the plurality of LBT bandwidths during the respective COT.

In an additional aspect of the disclosure, an apparatus includes means for communicating with a second wireless communication device in at least one listen-before-talk (LBT) bandwidth of a plurality of LBT bandwidths, downlink control information (DCI) indicating a starting point of a fixed frame period (FFP) in the respective LBT bandwidth; and means for communicating with the second wireless communication device, a communication during the respective FFP in one or more LBT bandwidths of the at least one LBT bandwidth.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
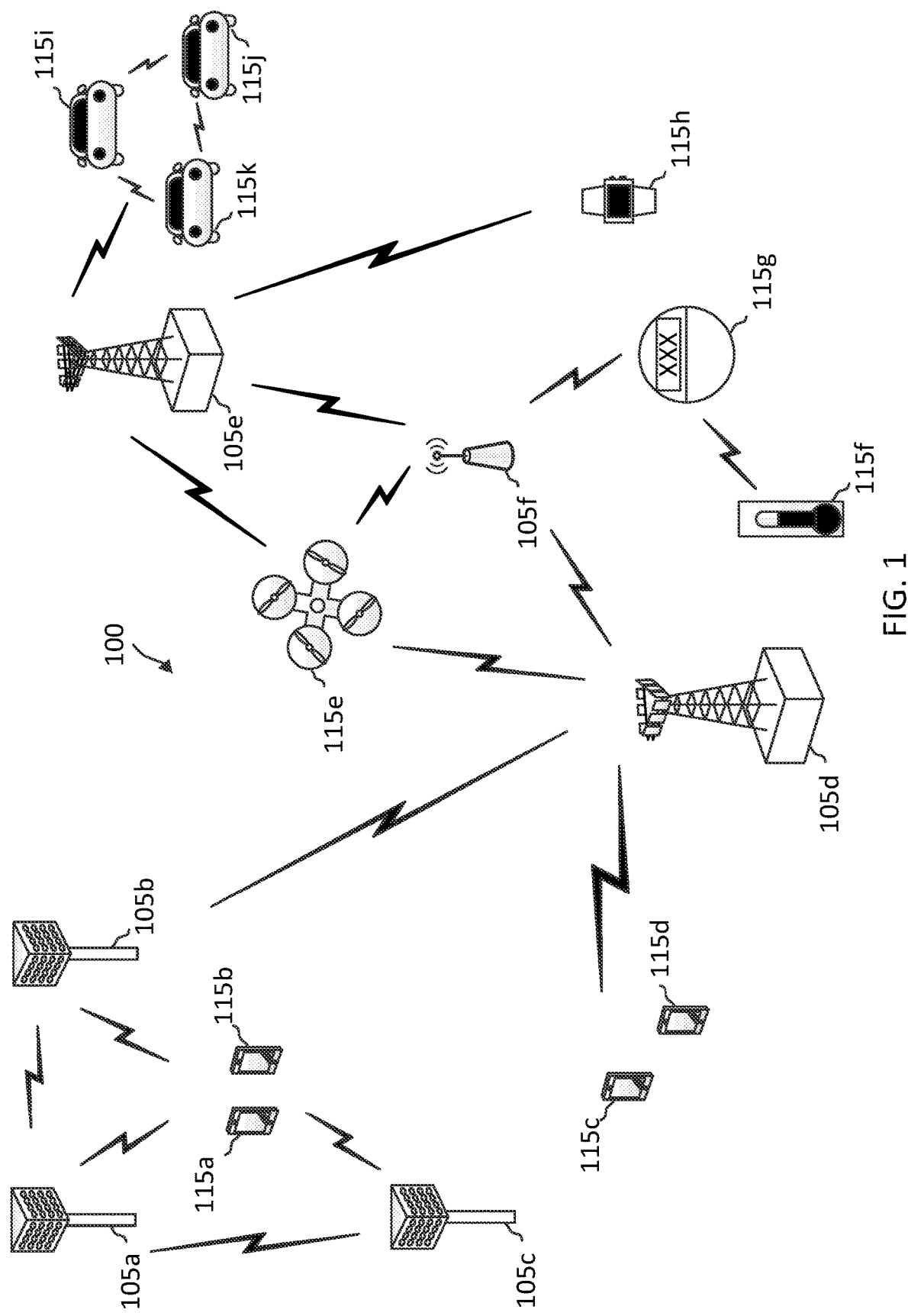
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

Two broad types of LBT schemes may include Load Based Equipment (LBE) and Frame Based Equipment (FBE). In the LBE approach, the channel sensing is performed at any time instant and random back-off is used if the channel is found busy. In FBE, channel sensing is performed at fixed time instants (e.g., contention period or clear channel assessment (CCA)), and if the channel is busy, the wireless communication device (e.g., BS or UE) backs off for a fixed time period and senses the channel again after this period. If the channel is free, the wireless communication device may use the next fixed frame period (FFP) for communicating DL and/or UL transmissions for up to a maximum channel occupancy time (COT). An FFP may include a COT followed by an idle period. The COT may include one or more transmission periods, which can be used for UL and/or DL transmissions. The idle period may be defined as being at an end of the FFP, and a BS may perform LBT during the idle period for communicating DL and/or UL transmissions in the next FFP.

In FBE mode, the UE may acquire information associated with the BS having acquired a COT in an FFP by detecting a signal/channel from the BS at a beginning of an FFP. One approach for the BS to notify the UE about the acquired COT is to utilize DCI format 2_0, which is described in 3GPP document TS 38.212 Release 15, titled "3rd Generation Partnership Project; Technical Specification Group Radio Access Network; NR; Multiplexing and channel coding," January, 2020, Table 7.3.1-1, which is incorporated herein by reference ("3GPP document"). In NR, DCI format 2_0 carries format information associated with a group of slots. The DCI format 2_0, however, may have a restriction that for DCI format 2_0 configurations, the BS may configure one or two decoding candidates for a DCI format 2_0 in a slot. The DCI format 20 may be a DCI type that notifies a group of UEs of the slot format and may be scrambled by slot format indicator-radio network temporary identifier (SFI-RNTI). Although the DCI format 2_0 is discussed in the examples, it should be understood that the present disclosure is not limited to the DCI format 2_0. The present disclosure applies to any DCI formats that are described in the 3GPP document.

If the BS operates in a frequency band having a BW of about 80 MHz and is partitioned into four LBT bandwidths, with each LBT bandwidth having a BW of about 20 MHz, the BS may operate in four different LBT bandwidths. The BS performs LBT independently in each LBT bandwidth and may desire to transmit four DCI format 2_0, one in each LBT bandwidth. The UE may detect the DCI in each of LBT bandwidth separately.

The present disclosure provides techniques for transmitting DCI for multiple LBT bandwidths that may overcome the restriction of DCI format 2_0. If the FFPs in a plurality of LBT bandwidths are aligned, the BS may transmit PDCCH carrying DCI to indicate whether the BS was able to acquire a COT in the respective FFP. The FFP structure may include a COT followed by an idle period. If the FFPs of the BSs are aligned, the idle periods of the FFPs are also aligned, and the starting points of the FFPs are the same. In some aspects, the restriction is lifted and the BS transmits more than two DCIs to the UE. In some aspects, the BS does not transmit more than two DCIs to the UE, even when the BS is operating in more than two LBT bandwidths. For example, the BS may transmit a DCI in an LBT bandwidth of a plurality of LBT bandwidths, where the DCI indicates whether the BS acquired a COT in an FFP across the plurality of LBT bandwidths. Accordingly, an advantage may provide for conservation of resources because the DCI transmitted in the LBT bandwidth may apply to multiple LBT bandwidths.

If the FFPs in a plurality of LBT bandwidths are misaligned, the BS may transmit PDCCH carrying DCI indicating a starting point of the respective FFP. A first FFP is aligned with a second FFP if the starting point of the first FFP is the same as the starting point of the second FFP. The DCI search space frequency location may be time varying and associated with the starting point of an FFP for each LBT bandwidth of the plurality of LBT bandwidths. The BS may implement a time varying DCI (e.g., DCI format 2_0) monitoring position and may select the LBT bandwidth starting point aligned with a selected DCI starting point. Accordingly, an advantage may provide for reducing the complexity of the UE because the DCI transmitted in the LBT bandwidth may provide information to the UE regarding the starting point of the FFP in the respective LBT bandwidth.

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands or LBT bandwidths. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The DCI may indicate scheduling information for the UE 115. The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In an embodiment, the network 100 may be an NR network deployed over a licensed or unlicensed spectrum. The network 100 may operate over a shared channel, which may include shared frequency bands or unlicensed frequency bands, for example, at about 3.5 gigahertz (GHz), sub-6 GHz or higher frequencies in the mmWav band. In such an embodiment, a wireless communication device may share resources in the shared communication medium and may employ a listen-before-talk (LBT) procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods. A TXOP may also be referred to as channel occupancy time (COT).

A wireless communication device may perform an LBT (e.g., based on energy detection and/or signal detection) in the shared channel. LBT is a channel access scheme that may be used in the unlicensed spectrum. When the LBT results in an LBT pass, the wireless communication device may access the shared medium to transmit and/or receive data. In an example, the BS 105 may perform an LBT in a frequency band prior to transmitting in the frequency band and may transmit in one or more channels based on the LBT result. If the channel is available (performance of the LBT results in an LBT pass), the BS 105 may perform a DL transmission, receive an UL transmission from the UE 115, and/or schedule the UE 115 for data transmission and/or reception within a COT. If the channel is not available (performance of the LBT results in an LBT fail), the BS 105 does not gain immediate access to the shared medium for data scheduling or transmission. The BS 105 may back off and perform the LBT procedure again at a later point in time. In another example, the UE 115 may perform an LBT in the frequency band prior to transmitting in the frequency band and may transmit in one or more channels based on the LBT result. If the channel is available (performance of the LBT results in an LBT pass), the UE 115 may perform an UL transmission or receive a DL transmission from the BS 105. If the channel is not available (performance of the LBT results in an LBT fail), the UE 115 may back off and perform the LBT procedure again at a later point in time.

In FBE mode, an FFP may include a COT followed by an idle period. Before the BS 105 communicates DL and/or UL transmissions during an FFP, the BS 105 performs an LBT before the start of the FFP during an idle period of the immediately preceding FFP. A first FFP immediately precedes a second FFP if the first FFP precedes the second FFP and no other FFPs are located between the first and second FFPs. During the idle period, the BS 105 may contend for a medium and perform an LBT. An idle period may also be referred to as an idle duration or a contention period. Additionally, a COT may also be referred to as a transmission period. A COT may include one or more LBT gaps, which may break the COT into more than two transmission periods in the FFP. An LBT gap may be an idle period that is reserved before each DL/UL starting position of the COT. The LBT gap may allow for the BS 105 and/or the UE 115 to switch from an UL-to-DL communication and/or switch from a DL-to-UL communication.

In FBE mode, the RMSI may include a semi-static channel access configuration indicating the FBE mode, and the FFP configuration may be included in the SIB1. Additionally or alternatively, the FFP may be signaled for a UE 115 with UE-specific RRC signaling for FBE secondary cells. Accordingly, a UE 115 may obtain structure information of the FFPs. For example, the BS 105 may transmit PDCCH carrying DCI, which may indicate COT-structure information (COT-SI) to a UE 15. The UE 115 may obtain the COT-SI at a start of an FFP. Additionally, an FFP is fixed or configurable by the network 100. In some aspects, the FFP is configured from the range of about 1 ms to about 10 ms. The FFP may be restricted to particular values (e.g., 1 ms, 2 ms, 2.5 ms, 4 ms, 5 ms, or 10 ms). The idle period and the FFP may have fixed durations and/or predetermined times. In some aspects, each idle period may include one or more OFDM symbols, and each FFP may include one or more subframes, slots, or TTIs. In some aspects, the FFP may be defined in units of slots (e.g., about 250 microseconds ($\mu$s) long). The FFP structure is pre-determined and known by the BSs, which may be time-synchronized when operating in the shared spectrum.

In some examples, a starting position of an FFP within every two radio frames may start from an even radio frame and may be given by the equation $\{i*P\}$, where $i=\{0, 1, \ldots, 20/(P-1)\}$, and P is the FFP in a unit of time (e.g., ms). Additionally, an idle period for a given SCS may be provided by the equation {ceiling (minimum idle period allowed by regulations/$T_s$)}, where $T_s$ is the symbol duration for the given SCS, and a PRACH resource is considered invalid if it overlaps with the idle period of an FFP when the FBE operation is indicated. An example of the minimum idle period allowed by regulations may be provided by the equation {maximum (5% of FFP, 100 $\mu$s). Other examples of minimum idle periods allowed by regulations are within the scope of the present disclosure.

Figure 2:
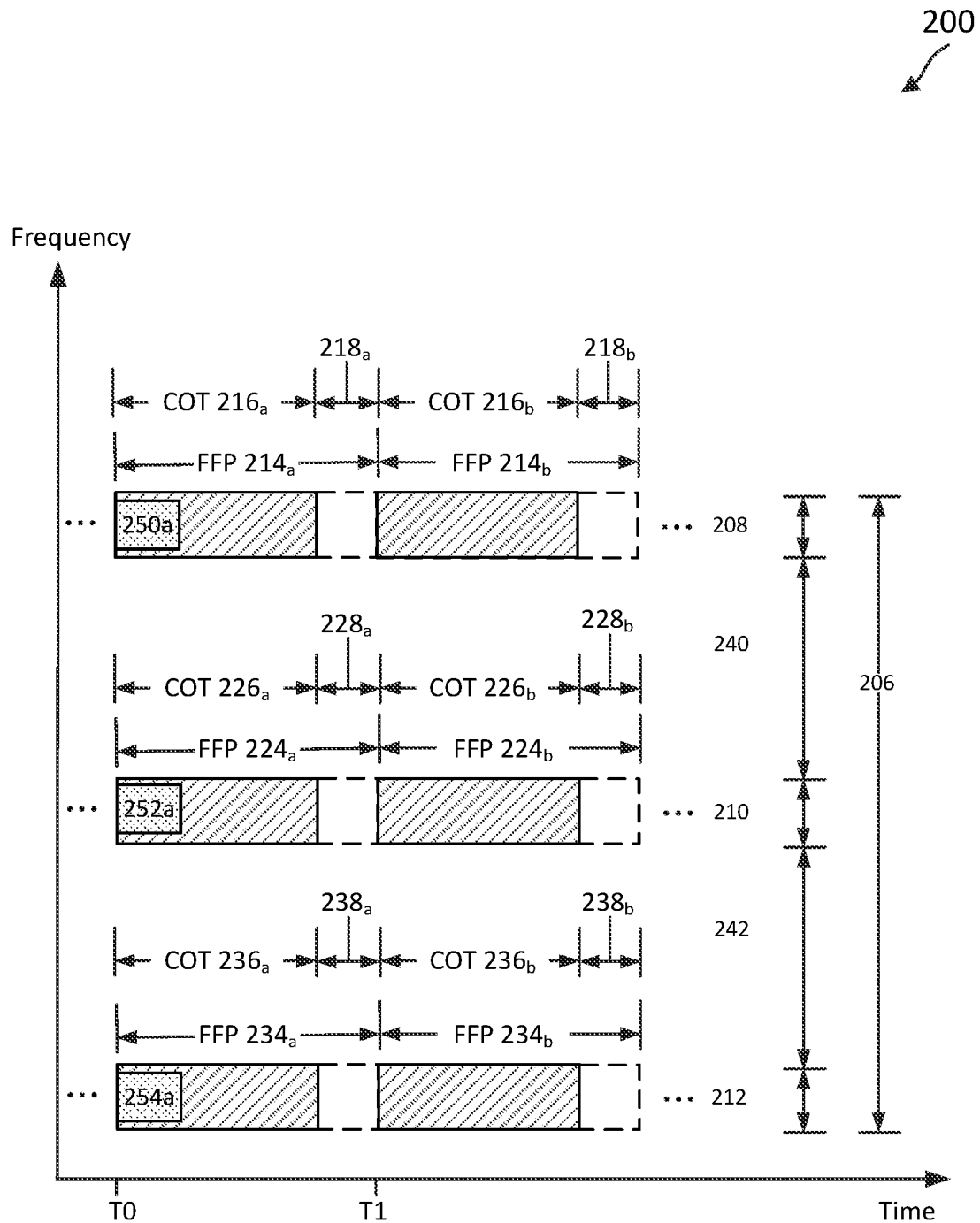
FIG. 2 illustrates a frame based equipment (FBE) scheme according to one or more aspects of the present disclosure.
Figure 3:
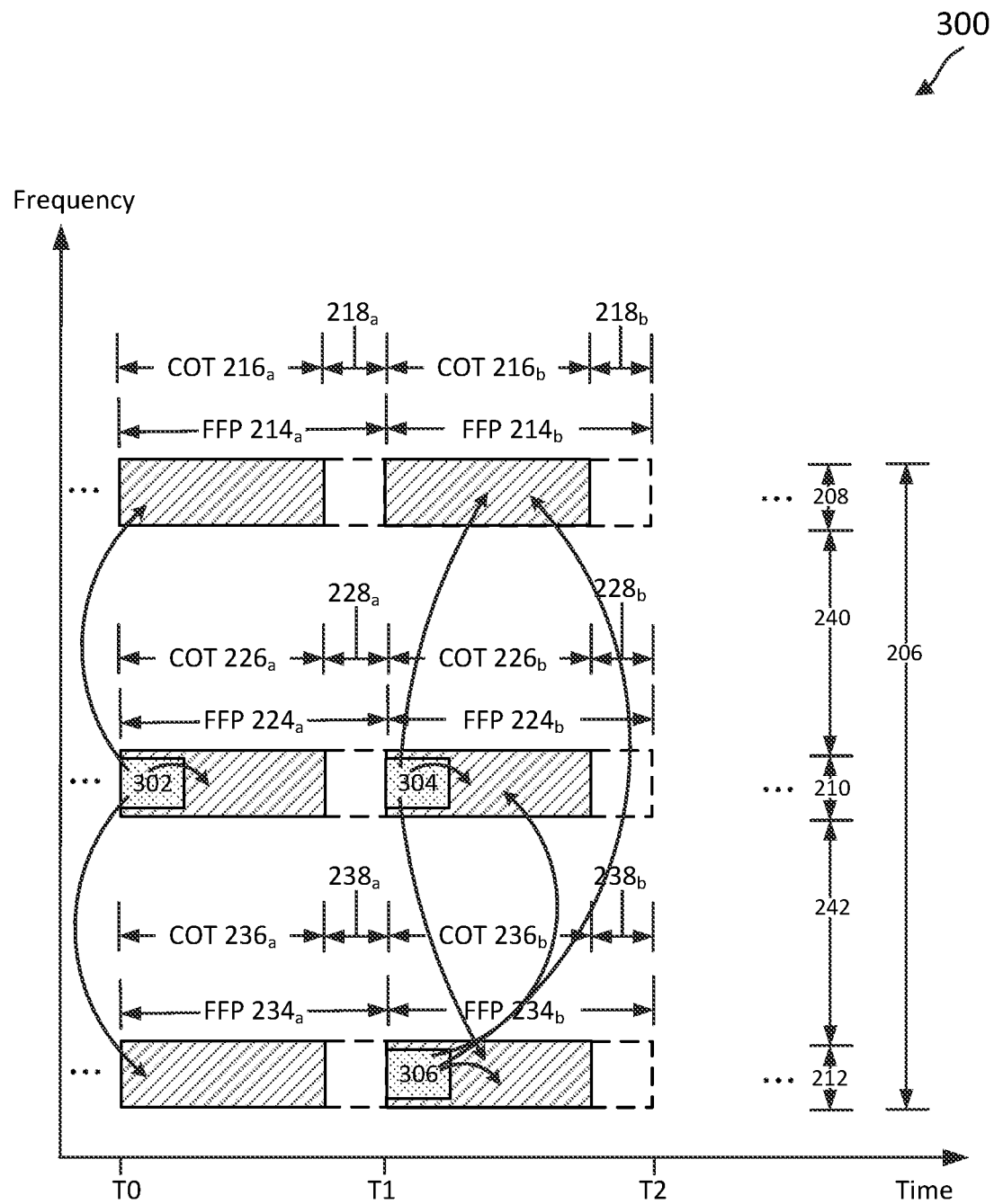
FIG. 3 illustrates an FBE scheme according to one or more aspects of the present disclosure.

FIGS. 2 and 3 illustrate FBE schemes in which the BS 105 transmits PDCCH carrying DCI in one or more LBT bandwidths, where the DCI indicates that the BS 105 acquired a COT in one or more of the LBT bandwidths. In some aspects, the DCI is a DCI format 2_0. If the BS 105 transmits DCI in accordance with the DCI format 2_0, the BS 105 may transmit at most two DCIs at a time. The FBE scheme illustrated in FIG. 2 may be advantageous if an extension of the number of DCI candidates (e.g., more than two) is desired, as will be discussed in further detail below. The FBE scheme illustrated in FIG. 3 may be advantageous if the number of DCI candidates is two, as will be discussed in further detail below. It should also be understood that the number of DCI candidates in aspects of FIG. 3 may be extended to greater than two DCI candidates. Additionally, the pattern-filled boxes of FIGS. 2 and 3 may represent transmission of PDCCH and/or PDSCH and/or reception of PUCCH and/or PUSCH in a transmission period. While an entire transmission period is pattern-filled, in some aspects, a transmission may occur only in a corresponding portion of the transmission period (e.g., in a slot or mini-slot of the transmission period).

In some aspects, the BS 105 acquires a COT and transmits COT-SI (e.g., DCI format 2_0) to the UE 115. The UE 115 may monitor for PDCCH and receive the DCI format 2_0. The UE 115 may monitor for DL and/or UL scheduling grants from the BS 05 during the COT (e.g., the COT including multiple slots). In an example, the UE 115 may receive a DL grant, and the UE 115 may receive a DL communication based on the DL grant from the BS 105. In another example, the UE 115 may receive an UL grant, and the UE 115 may perform LBT and transmit an UL communication based on an LBT pass. In another example, the BS 105 indicates that the UE 115 may share the COT, and the UE 115 performs LBT and transmits an UL communication based on an LBT pass.

FIG. 2 illustrates an FBE scheme 200 in which the BS 105 transmits PDCCH carrying DCI in each LBT bandwidth in which the BS 105 acquires a COT according to one or more aspects of the present disclosure. The x-axis represents time in some constant units. The y-axis represents frequency in some constant units. The scheme 200 may be employed by a BS 105 and a UE 115.

The BS 105 may operate in a frequency band 206 (e.g., BWP), but may operate in different LBT bandwidths. An LBT bandwidth may also be referred to as a subband in the present disclosure. The FBE scheme 200 may partition the frequency band 206 into a plurality of LBT bandwidths 208, 210, and 212. The frequency band 206 and the LBT bandwidths 208, 210, and 212 may have any suitable BWs. As an example, the frequency band 206 may have a BW of about 60 MHz and may be partitioned into three LBT bandwidths 208, 210, and 212, where each LBT bandwidth may have a BW of about 20 MHz. Between LBT bandwidths 208 and 210 is a guard band 240, and between LBT bandwidths 210 and 212 is a guard band 242.

In the example illustrated in FIG. 2, the BS 105 may have a plurality of aligned FFPs in the LBT bandwidths 208, 210, and 212. In other words, the FFPs for different LBT bandwidths are aligned. A first FFP is aligned with a second FFP if the starting point of the first FFP is the same as the starting point of the second FFP. The FFP structure may include a COT followed by an idle period. For the BS 105, FFP $214_a$, FFP $224_a$, and FFP $234_a$ are aligned and have a starting point at time T0, and FFP $214_b$, FFP $224_b$, and FFP $234_b$ are aligned and have a starting point at time T1. Additionally, the FFP 214 of the BS 202 includes a COT 216 followed by an idle period 218, the FFP 224 of the BS 202 includes a COT 226 followed by an idle period 228, and the FFP 234 of the BS 202 includes a COT 236 followed by an idle period 238.

During an idle period, the BS 105 may perform different types of LBTs, which may include category-1 (CAT1) LBT, category-2 (CAT2) LBT, category-3 (CAT3) LBT, and/or category-4 (CAT4) LBT. CAT1 LBT refers to no LBT is required prior to a transmission. CAT2 LBT is referred to as a one-shot LBT without random backoff. CAT3 LBT includes random backoff. CAT4 LBT includes random backoff and a variable contention window. In some examples, the BS 105 performs a one-shot LBT during an idle period before an FFP to acquire a COT in the FFP. If the BS 105 performs an LBT in an LBT bandwidth and the LBT results in an LBT pass, the BS 105 may transmit PDCCH carrying DCI in the LBT bandwidth. The DCI may indicate that the BS 105 acquired a COT in an FFP in the LBT bandwidth.

In the example illustrated in FIG. 2, the BS 105 transmits PDCCH carrying DCI in each LBT bandwidth in which the BS 105 has acquired a COT. In other words, if the BS 105 operates in "N" LBT bandwidths, the BS 105 may have up to "N" DCI candidates for transmissions, where "N" is a number greater than one. The BS 105 may pass LBT in "M" of the "N" LBT bandwidths, where "M" is a number that does not exceed "N". Accordingly, the BS 105 may transmit "M" DCI, one DCI in each of the "M" LBT bandwidths. In an example, "M" is a number that is greater than two (e.g., three, four, or more).

The PDCCH in one LBT bandwidth may indicate the availability of that LBT bandwidth only. For example, regarding LBT bandwidth 208, the BS 105 may perform an LBT during an idle period that occurs before time T0 and is included in an FFP that immediately precedes the FFP $214_a$. Based on a failed LBT in the LBT bandwidth 208, the BS 105 skips the FFP $214_a$ and contends for the medium again during an idle period $218_c$, which is included in the FFP $214_a$ but occurs before the start of the next FFP $214_b$. Based on a successful LBT, the BS 105 reserves a COT $216_a$ and communicates DL and/or UL signals during the COT $216_a$ in the FFP $214_a$. The BS 204 may share the COT $216_a$ with the UE 115 by transmitting to the UE 115, PDCCH carrying DCI $250_a$ at the beginning of the FFP $214_a$, where the DCI $250_a$ indicates information about the COT $216_a$. The UE 115 may detect the DCI $250_a$ and decode the DCI $250_a$. The UE 115 may monitor for DL and/or UL scheduling grants from the BS 05 during the COT $216_a$. In an example, the UE 115 may receive a DL grant, and the UE 115 may receive a DL communication based on the DL grant from the BS 105. In another example, the UE 115 may receive an UL grant, and the UE 115 may perform LBT and transmit an UL communication based on an LBT pass. In another example, the BS 105 indicates that the UE 115 may share the $216_a$, and the UE 115 performs LBT and transmits an UL communication based on an LBT pass.

The BS 105 may perform similar actions for the LBT bandwidth 210 and the LBT bandwidth 212. Accordingly, the BS 105 may reserve a COT $226_a$ and communicate DL and/or UL signals during the COT $226_a$ in the FFP $224_a$. The BS 204 may share the COT $226_a$ with the UE 115 by transmitting to the UE 115, PDCCH carrying DCI $252_a$ at the beginning of the FFP $224_a$, where the DCI $252_a$ indicates information about the COT $226_a$. Similarly, the BS 105 may reserve a COT $236_a$ and communicate DL and/or UL signals during the COT $236_a$ in the FFP $234_a$. The BS 204 may share the COT $236_a$ with the UE 115 by transmitting to the UE 115, PDCCH carrying DCI $254_a$ at the beginning of the FFP $234_a$, where the DCI $254_a$ indicates information about the COT $236_a$. Accordingly, the BS 105 may transmit PDCCH carrying the DCI $250_a$ in response to an LBT pass in the LBT bandwidth 208, PDCCH carrying the DCI $252_a$ in response to an LBT pass in the LBT bandwidth 210, and the PDCCH carrying the DCI $254_a$ in response to an LBT pass in the LBT bandwidth 212. If the BS 105 does not pass LBT in an LBT bandwidth, the BS 105 does not transmit PDCCH carrying DCI in the respective LBT bandwidth. For example, if the BS 105 does not pass LBT in the LBT bandwidth 208, then the BS 105 does not transmit the DCI $250_a$, but does transmit the DCI $252_a$ and the DCI $254_a$.

The UE 115 may perform blind PDCCH detection to search for PDCCH in a search space. The search space may include a plurality of LBT bandwidths including the LBT bandwidths 208, 210, and 212. If the UE 115 detects DCI in one or more LBT bandwidths of the plurality of LBT bandwidths, the UE 115 determines that the BS 105 acquired a COT in an FFP in the respective LBT bandwidth. The UE 115 may then monitor for communications from the BS 105 during the COT. For instance, the UE 115 may receive DL communications from the BS 105. In some instances, the BS 105 may share the COT with the UE 115. The UE 115 may perform LBT in the respective LBT bandwidth prior to an UL transmission during the shared COT. If the LBT results in an LBT pass, the UE 115 may transmit an UL communication to the BS 105. If the LBT results in an LBT fail, the UE does not transmit UL communications to the BS 105. The UE 115 is aware of the "N" DCI candidates in the search space based on control channel elements (CCE) and various PDCCH configurations and may monitor the "N" DCI candidates (e.g., the number of LBT bandwidths in which the BS 105 operates). Accordingly, the UE 115 may monitor the search space and decode each of the "M" DCI candidates to determine whether the BS 105 transmitted PDCCH carrying DCI in the search space. Of the "N" DCI candidates, the UE 115 may successfully decode "M" DCI candidates, which represents the actual number of DCIs transmitted by the BS 105.

The UE 115 may detect the DCI $250_a$, the DCI $252_a$, and the DCI $254_a$, decode each of these DCIs, and determine that the BS 105 acquired the COT $216_a$ in the FFP $214_a$, the COT $226_a$ in the FFP $224_a$, and the COT $236_a$ in the FFP $234_a$. The UE 115 may monitor for DL communications from the BS 105 in each of the LBT bandwidths in which the UE 115 has determined that the BS 105 was able to acquire a COT. For example, the BS 105 may transmit a DL communication to the UE 115, which may receive the DL communication from the BS 105. In some examples, the UE 115 may perform LBT in each of the LBT bandwidths in which the UE 115 has determined that the BS 105 was able to acquire a COT. In each LBT bandwidth in which the UE 115 passes LBT, the UE 115 may transmit a communication to the BS 105 during the COT in the respective LBT bandwidth. For example, the UE 115 may transmit an UL communication to the BS 105, and the BS 105 may receive the UL communication from the UE.

Although three LBT bandwidths are illustrated in FIG. 2, it should be understood that the BS 105 may operate in more than three LBT bandwidths. Additionally, the BS 105 may perform an LBT in each LBT bandwidth of a first plurality of LBT bandwidths and a second plurality of LBT bandwidths. A sum of the first and second pluralities of LBT bandwidths may be three or greater (four, five, or more). The BS 105 may pass LBT in each of the first plurality of LBT bandwidths (e.g., LBT bandwidths 208, 210, and 212) and may fail LBT in each of the second plurality of LBT bandwidths. Accordingly, the BS 105 may transmit to the UE 115 in each LBT bandwidth of the first plurality of LBT bandwidths, DCI indicating that the BS 105 has acquired a COT in the respective LBT bandwidth. The BS 105 refrains from or does not transmit to the UE 115 in any LBT bandwidth of the second plurality of LBT bandwidths, DCI indicating that the BS 105 has acquired a COT in the respective LBT bandwidth.

The UE 115 may monitor for PDCCH in each of the first and second pluralities of LBT bandwidths. The UE 115 may detect DCI in each LBT bandwidth of the first plurality of LBT bandwidths, where the DCI indicates that the BS 105 has acquired a COT in the respective LBT bandwidth, and where the UE 115 successfully decodes the DCI. Additionally, the UE 115 does not detect in each LBT bandwidth of the second plurality of LBT bandwidths DCI indicating that the BS 105 has acquired a COT in the respective LBT bandwidth. The UE 115 may then monitor for communications in the first plurality of LBT bandwidths from the BS 105 during the COT. For instance, the UE 115 may receive DL communications in one or more LBT bandwidths of the first plurality of LBT bandwidths from the BS 105. In some instances, the BS 105 may share the COT with the UE 115. The UE 115 may perform an LBT in one or more LBT bandwidths of the first plurality of LBT bandwidths prior to an UL transmission during the shared COT. The UE 115 may transmit to the BS 105, an UL communication in one or more LBT bandwidths of the first plurality of LBT bandwidths in which the UE 115 passes LBT. The BS 105 may receive the UL communication from the UE accordingly. The BS 105 and the UE 115 may perform similar actions as discussed above for FFP $214_b$, FFP $224_b$, and FFP $234_b$.

In the example illustrated in FIG. 2, the BS 105 transmits more than two DCIs in the LBT bandwidths. It may be desirable to reduce the number of DCIs transmitted by the BS 105 down to two or less to reduce UE complexity. For example, if the PDCCH search space is reduced, the UE 115 may monitor fewer LBT bandwidths for PDCCH.

FIG. 3 illustrates an FBE scheme 300 in which the BS 105 transmits in an LBT bandwidth, DCI indicating that the BS 105 has acquired a COT in a plurality of LBT bandwidths according to one or more aspects of the present disclosure. The x-axis represents time in some constant units. The y-axis represents frequency in some constant units. The scheme 300 may be employed by a BS 105 and a UE 115.

FIG. 3 illustrates the FFPs 214, 224, and 234 and the LBT bandwidths 208, 210, and 212, as discussed above in FIG. 2. The BS 105 may perform LBT in a plurality of LBT bandwidths including LBT bandwidth 208, 210, and 212 to acquire the COT $216_a$ in the FFP $214_a$, the COT $226_a$ in the FFP $224_a$, and the COT $236_a$ in the FFP $234_a$. In some aspects, the COTs $216_a$, $226_a$, and $236_a$ have the same COT-SI and accordingly a common COT-SI (e.g., FFP duration, idle periods, COT duration, LBT gaps, FFP starting point, etc.).

If the BS 105 passes LBT in each LBT bandwidth of the plurality of LBT bandwidths, the BS 105 transmits PDCCH carrying DCI 302 in the LBT bandwidth 210, where the DCI 302 may indicate that the BS 105 has acquired a COT across the plurality of LBT bandwidths. The BS 105 has acquired a COT across the plurality of LBT bandwidths if the BS 105 has acquired a COT in each LBT bandwidth of the plurality of LBT bandwidths 208, 210, and 212. The DCI 302 may contain COT-SI that is applied and/or applicable to each LBT bandwidth of the plurality of LBT bandwidths. The BS 105 may implement an "all or nothing" approach for indicating to the UE 115 in which LBT bandwidths the BS 105 was able to acquire a COT. For example, if the BS 105 passes LBT in a first set of the plurality of LBT bandwidths (e.g., LBT bandwidth 208 and 210) and does not pass LBT in a second set of the plurality of LBT bandwidths (e.g., LBT bandwidth 212), the BS 105 may refrain from transmitting PDCCH carrying the DCI 302 in any of the LBT bandwidths.

Although one DCI 302 is shown corresponding to FFP $214_a$, FFP $224_a$, and FFP $234_a$ and as indicating availability of a COT acquired by the BS 105 in the LBT bandwidths 208, 210, and 212, it should be understood that in other aspects, more than one DCI may be used for this indication. For example, for robustness, the BS 105 may transmit the DCI in a subset of the plurality of LBT bandwidths, where the DCI in the subset may indicate that the BS 105 has acquired a COT in each LBT bandwidth of the plurality of LBT bandwidths. The subset of LBT bandwidths may include more than one LBT bandwidth, but include fewer LBT bandwidths than the plurality of LBT bandwidths.

Regarding FFPs $214_b$, $224_b$, and $234_b$, the BS 105 may perform LBT in the plurality of LBT bandwidths including LBT bandwidth 208, 210, and 212 to acquire a COT in the respective FFPs. If the BS 105 passes LBT in each LBT bandwidth of the plurality of LBT bandwidths, the BS 105 may transmit PDCCH carrying DCI 304 in the LBT bandwidth 210 and transmit PDCCH carrying DCI 306 in the LBT bandwidth 212. The DCI 304 and the DCI 306 may contain the same information. For example, each of the DCI 304 and the DCI 306 may indicate that the BS 105 has acquired a COT in each LBT bandwidth of the plurality of LBT bandwidths and may contain COT-SI that is applied and/or applicable to each LBT bandwidth of the plurality of LBT bandwidths.

As discussed above, the UE 115 may perform LBT and may communicate with the BS 105 during the duration of the respective FFP if the LBT results in an LBT pass.

Although in the example illustrated in FIG. 3, the BS 105 transmits the DCI 302 in the LBT bandwidth 210, it should be understood that the BS 105 may transmit the DCI 302 in any one of LBT bandwidth 208, LBT bandwidth 210, or LBT bandwidth 212. Similarly, although in the example illustrated in FIG. 3, the BS 105 transmits a DCI in two LBT bandwidths (e.g., the DCI 304 in the LBT bandwidth 210 and the DCI 306 in the LBT bandwidth 212), it should be understood that the BS 105 may transmit the DCI 304, 306 in any two or more of the plurality of LBT bandwidths (e.g., three, four, five, or more) in which the BS 105 operates. For example, the BS 105 may transmit the DCI 304 in the LBT bandwidth 208 and the DCI 306 in the LBT bandwidth 210. In some examples, the BS 105 may transmit the DCI in three of a plurality of LBT bandwidths.

Figure 4:
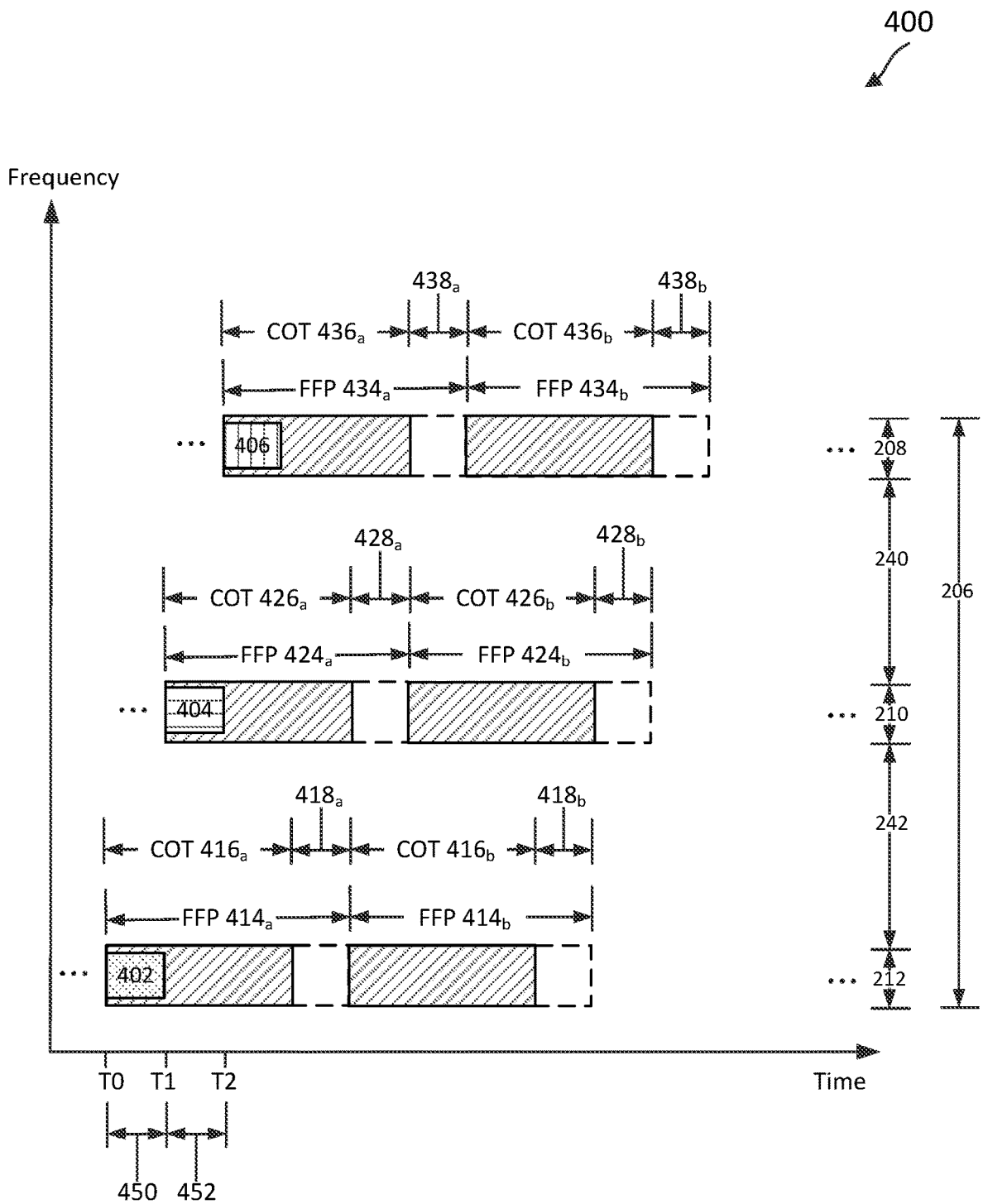
FIG. 4 illustrates an FBE scheme according to one or more aspects of the present disclosure.
Figure 5:
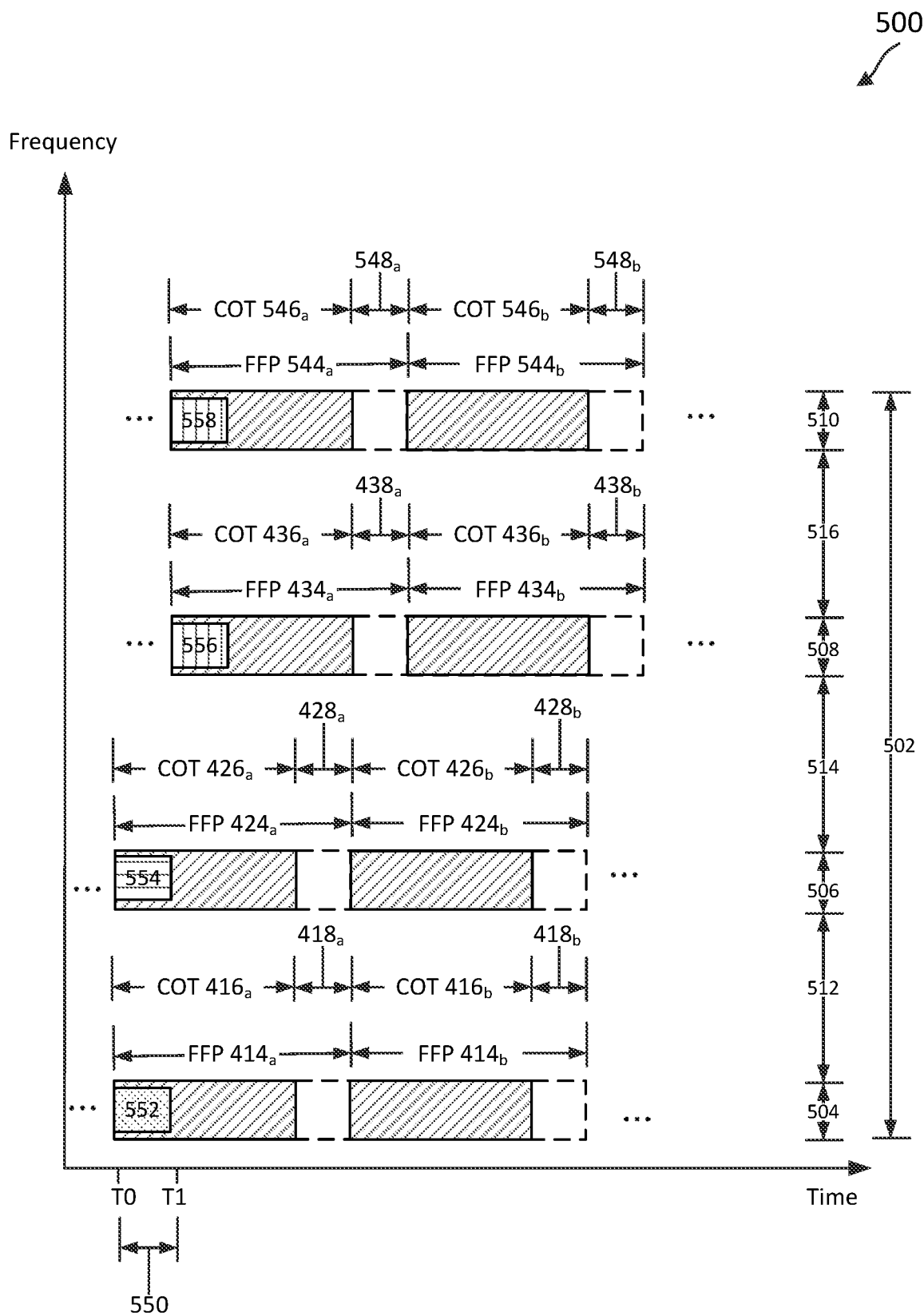
FIG. 5 illustrates an FBE scheme according to one or more aspects of the present disclosure.
Figure 6:
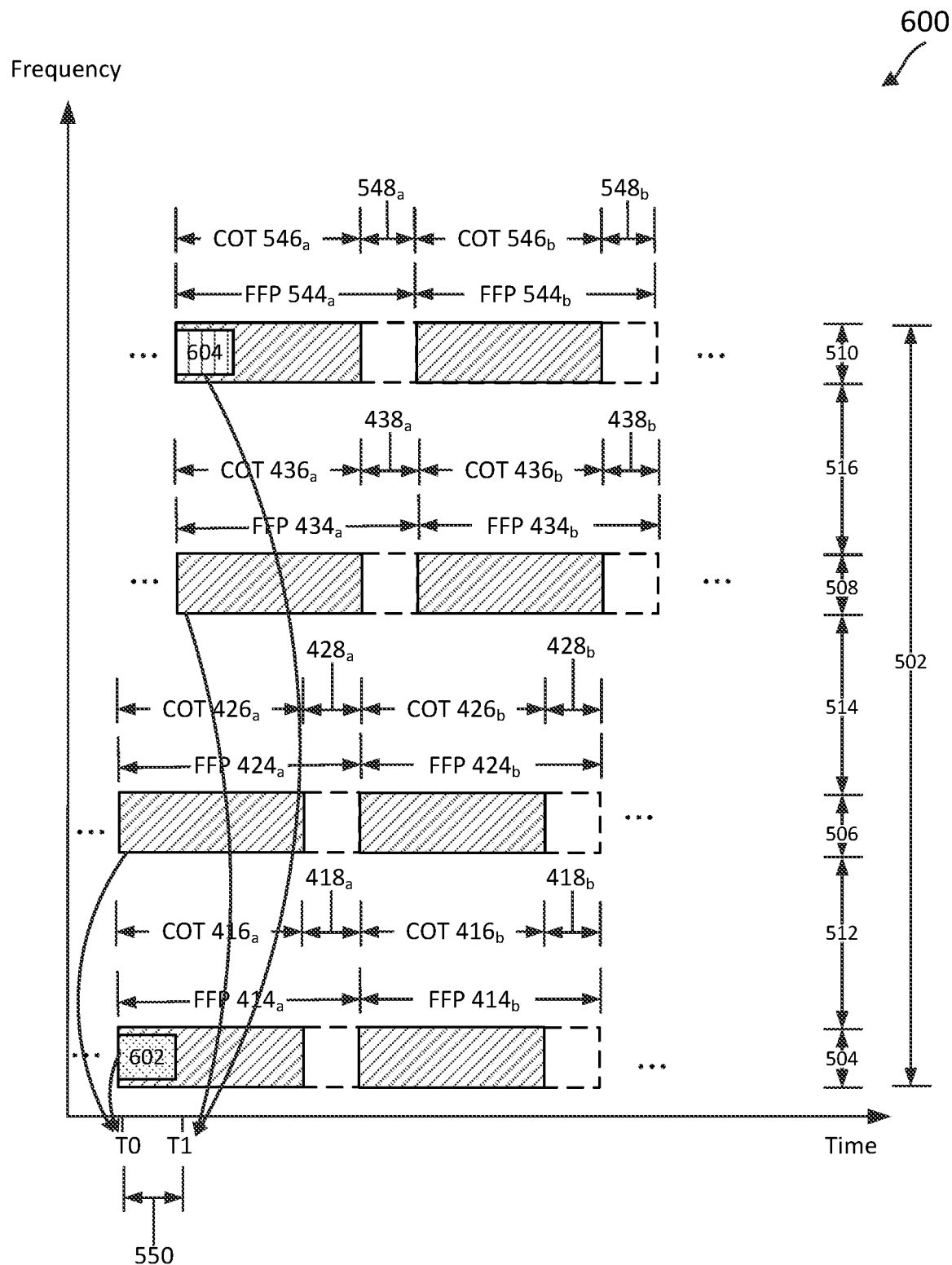
FIG. 6 illustrates an FBE scheme according to one or more aspects of the present disclosure.

FIGS. 4-6 illustrate FBE schemes in which the BS 105 transmits PDCCH carrying DCI in one or more LBT bandwidths, where the DCI indicates a starting point of an FFP based on the LBT bandwidth in which the DCI is transmitted. In some aspects, the DCI is a DCI format 2_0. The FBE scheme illustrated in FIG. 4 may be advantageous if extension of the number of DCI candidates (e.g., more than two) is desired, as will be discussed in further detail below. The FBE scheme illustrated in FIG. 5 or FIG. 6 may be advantageous if the number of DCI candidates is two, as will be discussed in further detail below. It should also be understood that the number of DCI candidates in aspects of FIGS. 5 and 6 may extended to greater than two DCI candidates. Additionally, the pattern-filled boxes of FIGS. 4-6 may represent transmission of PDCCH and/or PDSCH and/or reception of PUCCH and/or PUSCH in a transmission period. While an entire transmission period is pattern-filled, in some aspects, a transmission may occur only in a corresponding portion of the transmission period (e.g., in a slot or mini-slot of the transmission period).

FIG. 4 illustrates an FBE scheme 400 according to one or more aspects of the present disclosure. The x-axis represents time in some constant units. The y-axis represents frequency in some constant units. The scheme 400 may be employed by a BS 105 and a UE 115. In the example illustrated in FIG. 4, the BS 105 may have misaligned FFPs in the LBT bandwidths 208, 210, and 212. In other words, the FFPs for different LBT bandwidths are misaligned. A first FFP is misaligned with a second FFP if the starting point of the first FFP is different from the starting point of the second FFP. The starting point of an FFP for each LBT bandwidth may be predetermined and/or fixed. An FFP $414_a$ has a starting point at time T0, an FFP $424_a$ has a starting point at time T1, and an FFP $434_a$ has a starting point at time T2. The BS 105 may configure a time difference between the FFP starting points in the LBT bandwidths. The time difference may be fixed or predetermined. For example, the BS 105 may configure a time difference 450 between the starting point of the FFP $414_a$ and the starting point of the FFP $424_b$, and the BS 105 may configure a time difference 452 between the starting point of the FFP $424_b$ and the starting point of the FFP $434_a$. Accordingly, the idle periods of the FFPs in the different LBT bandwidths 208, 210, and 212 are staggered and start at different times relative to each other.

The BS 105 performs an LBT during an idle period before the FFPs $414_a$, $424_a$, and $434_a$ to acquire a COT in the respective FFP. Based on a failed LBT in a LBT bandwidth, the BS 105 skips the respective FFP and contends for the medium again during an idle period of the respective FFP. Based on a successful LBT, the BS 105 reserves a COT and communicates DL and/or UL signals during the COT in the respective FFP. The BS 105 may share the COT with the UE 115 by transmitting PDCCH carrying DCI at the beginning of the FFP in the respective LBT bandwidth to the UE 115, where the DCI indicates information about the COT. In some examples, the DCI may be DCI format 2_0.

As shown in FIG. 4, the BS 105 may transmit the DCI at different frequency locations, and each frequency location may be associated with a starting point of an FFP in the frequency location. In some aspects, the DCI search space frequency location is time varying and associated with the starting point of an FFP for each LBT bandwidth of the plurality of LBT bandwidths (e.g., LBT bandwidths 208, 210, and 212). In some examples, the FBE scheme 400 may provide for time varying frequency location configuration for a search space, applicable to a type-3 common search space. In other words, the BS 105 may implement a time varying DCI (e.g., DCI format 2_0) monitoring position (e.g., search spaces in each of the LBT bandwidths can be offset from each other) and may select the LBT bandwidth starting point aligned with a selected DCI starting point.

The BS 105 and the UE 115 are aware of the relationship between the DCI frequency location and a start of the FFP in the frequency location. The BS 105 may transmit to a UE 115 in at least one LBT bandwidth of a plurality of LBT bandwidths, DCI indicating a starting point of a FFP in the respective LBT bandwidth. For example, the BS 105 may transmit the DCI in a frequency location based on the starting point of the FFP. For example, if the BS 105 transmits a DCI 402 in the LBT bandwidth 212, the starting point of the FFP $414_a$ is at time T0. If the BS 105 transmits a DCI 404 in the LBT bandwidth 210, the starting point of the FFP $424_a$ is at time T1. If the BS 105 transmits a DCI 406 in the LBT bandwidth 208, the starting point of the FFP $434_a$ is at time T3.

As discussed above, the UE 115 may monitor for PDCCH and detect the DCI. The UE 115 may monitor for DL/UL scheduling grants from the BS 105 during the COT. The UE 115 may perform LBT (e.g., based on an UL grant or an indication by the BS 105 to share the COT) and may communicate with the BS 105 during the duration of the respective FFP if the LBT results in an LBT pass. For example, the UE 115 may perform blind PDCCH detection to search for PDCCH in a search space and may perform PDCCH decoding in a search space (e.g., frequency resource) based on an FFP starting point. If the UE 115 detects the DCI 402 in the LBT bandwidth 212, the UE 115 may determine that a starting point of the FFP $414_a$ is at time T0. Similarly, if the UE 115 detects the DCI 404 in the LBT bandwidth 210, the UE 115 may determine that a starting point of the FFP $424_a$ is at time T1. Similarly, if the UE 115 detects the DCI 406 in the LBT bandwidth 208, the UE 115 may determine that a starting point of the FFP $434_a$ is at time T2.

In the example illustrated in FIG. 4, each of the FFPs in the plurality of LBT bandwidths is misaligned. In some aspects, the BS 105 may configure the FFPs such that at most two FFPs are misaligned. It may be advantageous for the BS 105 to misalign at most two FFPs if, for example, the BS 105 is under a restriction that the BS 105 may transmit at most two DCIs at a time. For example, if the DCI is a DCI format 2_0, the BS 105 may be under such a restriction. In this example, the BS 105 may transmit DCI in accordance with this restriction.

FIG. 5 illustrates an FBE scheme 500 in which at most two FFPs are misaligned according to one or more aspects of the present disclosure. The x-axis represents time in some constant units. The y-axis represents frequency in some constant units. The scheme 500 may be employed by a BS 105 and a UE 115.

In the example illustrated in FIG. 5, the BS 105 may operate in a frequency band 502 (e.g., BWP), but may operate in different LBT bandwidths. The FBE scheme 500 may partition the frequency band 502 into a plurality of LBT bandwidths including LBT bandwidths 504, 506, 508, and 510. The frequency band 502 and the LBT bandwidths 504, 506, 508, and 510 may have any suitable BWs. As an example, the frequency band 502 may have a BW of about 80 MHz and may be partitioned into four LBT bandwidths 504, 506, 508, and 510, where each LBT bandwidth may have a BW of about 20 MHz. Between LBT bandwidths 504 and 506 is a guard band 512, between LBT bandwidths 506 and 508 is a guard band 514, and between LBT bandwidths 508 and 510 is a guard band 516. The FFP structure may include a COT followed by an idle period.

In the example illustrated in FIG. 5, the BS 105 may have at most two misaligned FFPs in the plurality of LBT bandwidths. For example, a first set of LBT bandwidths of the plurality of LBT bandwidths has a starting point at time T0, where the first set of LBT bandwidths includes LBT bandwidths 504 and 506. A second set of LBT bandwidths of the plurality of LBT bandwidths has a starting point at time T1, where the second set of LBT bandwidths includes LBT bandwidths 508 and 510. The BS 105 may configure a time difference 550 between the first and second sets of LBT bandwidths. The time difference 550 may be fixed and/or predetermined. Additionally, the idle periods of the FFPs in the first set of LBT bandwidths are aligned and have the same starting point as each other, and the idle periods of the FFPs in the second set of LBT bandwidths are aligned and have the same starting point as each other. The idle periods of the FFPs in the first set of LBT bandwidths are misaligned with the idle periods of the FFPs in the second set of LBT bandwidths.

Similar to the FBE scheme 400, the BS 105 may transmit the DCI at different frequency locations, and each frequency location may be associated with a starting point of an FFP in the frequency location. The DCI search space frequency location is time varying and associated with the starting point of an FFP for each LBT bandwidth of the plurality of LBT bandwidths. In other words, the BS 105 may implement a time varying DCI (e.g., DCI format 2_0) monitoring position (e.g., search spaces in each of the LBT bandwidths can be offset from each other) and selects the LBT bandwidth starting point aligned with a selected DCI starting point. The BS 105 and the UE 115 are aware of the relationship between the DCI frequency location and a start of the FFP in the frequency location.

If the BS 105 transmits PDCCH carrying a DCI 552 in the LBT bandwidth 504 or transmits PDCCH carrying a DCI 554 in the LBT bandwidth 506, the starting point of the FFP in the respective LBT bandwidth is at time T0. If the BS 105 transmits PDCCH carrying a DCI 556 in the LBT bandwidth 508 or PDCCH carrying a DCI 558 in the LBT bandwidth 510, the starting point of the FFP in the respective LBT bandwidth is at time T1.

As discussed above, the UE 115 may detect the DCI accordingly. For example, if the UE 115 detects the DCI 552 in the LBT bandwidth 504, the UE 115 may determine that a starting point of the FFP $414_a$ is at time T0. Similarly, if the UE 115 detects the DCI 554 in the LBT bandwidth 506, the UE 115 may determine that a starting point of the FFP $424_a$ is at time T0. Similarly, if the UE 115 detects the DCI 556 in the LBT bandwidth 508, the UE 115 may determine that a starting point of the FFP $434_a$ is at time T1. Similarly, if the UE 115 detects the DCI 558 in the LBT bandwidth 510, the UE 115 may determine that a starting point of an FFP $544_a$ is at time T1. As discussed above, the UE 115 may monitor for communications from the BS 105 during the COT. For instance, the UE 115 may receive DL communications from the BS 105. In some instances, the BS 105 may share the COT with the UE 115. The UE 115 may perform LBT in the respective LBT bandwidth prior to a UL transmission during the shared COT. If the LBT results in an LBT pass, the UE 115 may transmit UL communication to the BS 105. If the LBT results in an LBT fail, the UE does not transmit UL transmission to the BS 105.

In FIG. 5, the BS 105 may transmit PDCCH carrying DCI in at most two LBT bandwidths of the plurality of LBT bandwidths. In some aspects, the DCI indicates a starting point of an FFP across the plurality of LBT bandwidths. If the BS 105 transmits two DCIs, the DCIs may indicate different starting points of an FFP relative to each other.

FIG. 6 illustrates an FBE scheme 600 according to one or more aspects of the present disclosure. The x-axis represents time in some constant units. The y-axis represents frequency in some constant units. The scheme 600 may be employed by a BS 105 and a UE 115. In the example illustrated in FIG. 6, the BS 105 may transmit DCI in accordance with a restriction that limits the number of DCI transmissions to two at a time.

In the example illustrated in FIG. 6, the BS 105 may use at most two different frequency locations to indicate the starting point of an FFP. The BS 105 may operate in a plurality of LBT bandwidths, where the plurality of LBT bandwidths includes a first set of LBT bandwidths including the LBT bandwidths 504 and 506 and a second set of LBT bandwidths including the LBT bandwidths 508 and 510. The FFPs in the first set of LBT bandwidths are aligned with each other and accordingly have the same starting point at time T0. The FFPs in the second set of LBT bandwidths are aligned with each other and accordingly have the same starting point at time T1. The BS 105 may configure the time difference 550 between the first and second sets of LBT bandwidths. Additionally, the UE 115 is aware of the LBT bandwidth groupings. For example, the UE 115 is aware that the first set of LBT bandwidths includes the LBT bandwidths 504 and 506 and the second set of LBT bandwidths includes the LBT bandwidths 508 and 510.

In some aspects, the BS 105 may implement an "all or nothing" approach for indicating to the UE 115 in which LBT bandwidths the BS 105 was able to acquire a COT and/or the starting point of the FFP in the respective LBT bandwidths.

If the BS 105 passes LBT in the LBT bandwidth 504, the BS 105 may transmit PDCCH carrying a DCI 602 containing COT-SI that is applied and/or applicable across the first set of LBT bandwidths. For example, the DCI 602 may indicate that a starting point of each LBT bandwidth of the first set of LBT bandwidths is at time T0. In some aspects, the DCI 602 may indicate that the BS 105 has acquired a COT in each LBT bandwidth of the first set of LBT bandwidths. For example, if the BS 105 passes LBT in LBT bandwidths 504 and 506 and accordingly acquires COTs $416_a$ and $426_a$, the BS 105 may transmit the DCI 602 in any of the LBT bandwidths of the first set (e.g., LBT bandwidth 504 or LBT bandwidth 506) to indicate that the BS 105 acquired a COT $416_a$, $426_a$ in the LBT bandwidths 504 and 506. If the BS 105 does not pass LBT in any one of the first set of LBT bandwidths (e.g., LBT bandwidth 504 and LBT bandwidth 506), the BS 105 may refrain from transmitting PDCCH carrying DCI 602 in any of the LBT bandwidths of the first set of LBT bandwidths.

If the BS 105 passes LBT in the LBT bandwidth 510, the BS 105 may transmit PDCCH carrying a DCI 604 containing COT-SI that is applied and/or applicable across the second set of LBT bandwidths. For example, the DCI 604 may indicate that a starting point of each LBT bandwidth of the second set of LBT bandwidths is at time T1. In some aspects, the DCI 604 may indicate that the BS 105 has acquired a COT in each LBT bandwidth of the second set of LBT bandwidths. For example, if the BS 105 passes LBT in LBT bandwidths 508 and 510 and accordingly acquires COTs $436_a$ and $544_a$, the BS 105 may transmit the DCI 604 in any of the LBT bandwidths of the second set (e.g., LBT bandwidth 508 or LBT bandwidth 510) to indicate that the BS 105 acquired a COT $436_a$, $5466_a$ in the LBT bandwidths 508 and 510. If the BS 105 does not pass LBT in any one of the second set of LBT bandwidths (e.g., LBT bandwidth 508 and LBT bandwidth 510), the BS 105 may refrain from transmitting PDCCH carrying DCI 604 in any of the LBT bandwidths of the second set of LBT bandwidths.

Figure 7:
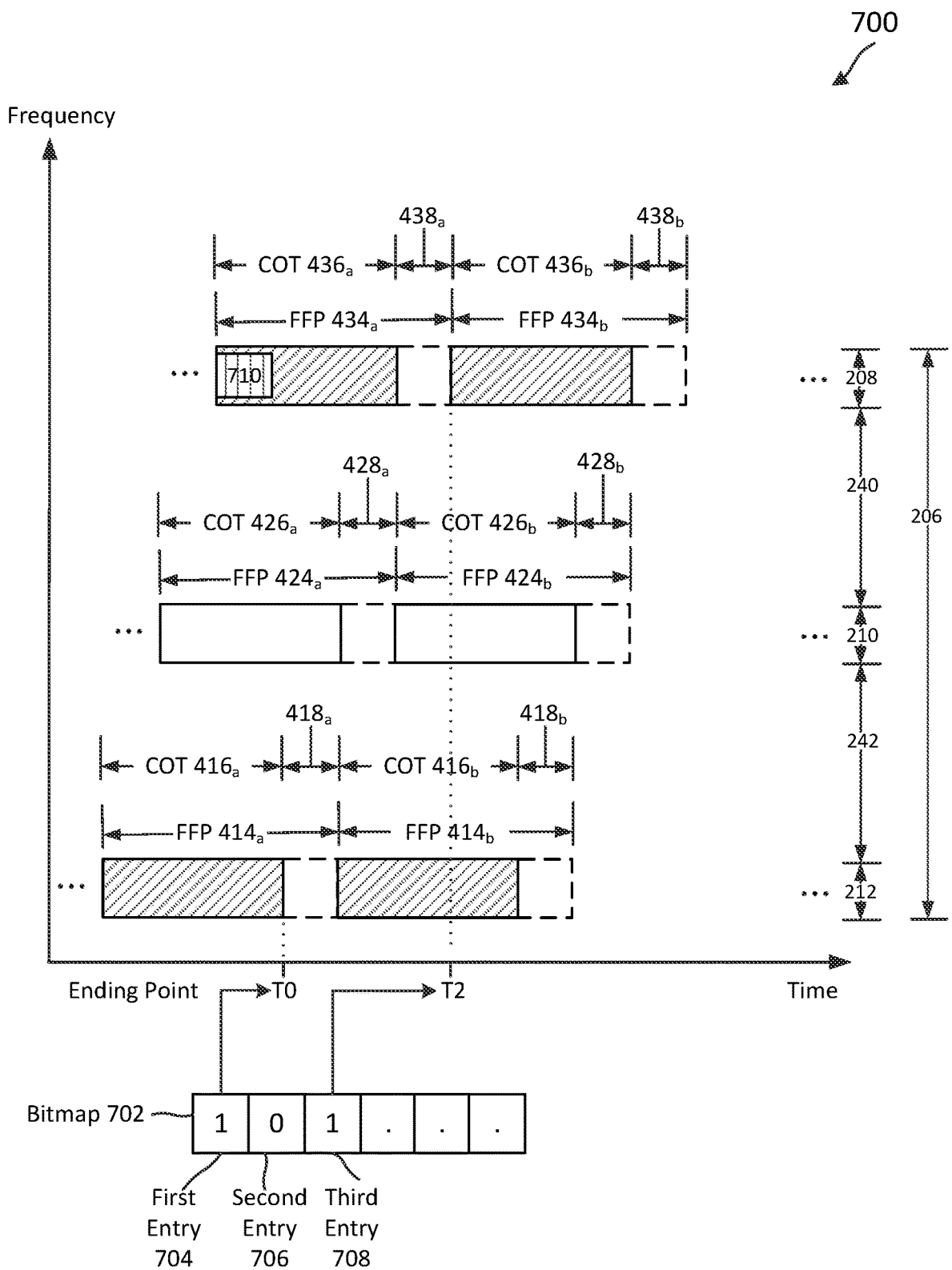
FIG. 7 illustrates an FBE scheme according to one or more aspects of the present disclosure

FIG. 7 illustrates an FBE scheme 700 according to one or more aspects of the present disclosure. The x-axis represents time in some constant units. The y-axis represents frequency in some constant units. The scheme 700 may be employed by a BS 105 and a UE 115. In FIG. 7, the BS 105 may attempt to acquire a COT in a first set of misaligned FFPs $414_a$, $424_a$, and $434_a$ and/or a second set of misaligned FFPs $414_b$, $424_b$, and $434_b$. The below examples may discuss the first set of misaligned FFPs $414_a$, $424_a$, and $434_a$, but it should be understood that the examples apply to other FFPs (e.g., the second set of FFPs).

In the example illustrated in FIG. 7, the BS 105 may transmit to a UE 115 in the LBT bandwidth 208, PDCCH carrying a DCI 710 that indicates a bitmap 702. The bitmap 702 may indicate whether the BS 105 acquired a COT in an FFP for a plurality of LBT bandwidths. The BS 105 may include the bitmap 702 in the COT-SI. Each entry in the bitmap 702 may correspond to an LBT bandwidth of the plurality of LBT bandwidths, and each bit in the bitmap 702 may indicate whether the BS 105 acquired a COT in an FFP in the respective LBT bandwidth. For example, the length of the bitmap 702 may be equal to the number of LBT bandwidths in the plurality of LBT bandwidths.

The BS 105 may store bits in the bitmap 702 based on whether the BS 105 was able to acquire COTs in a plurality of LBT bandwidths corresponding to the bits. If a bit corresponding to an LBT bandwidth is one in the bitmap 702, the bit indicates that the BS 105 acquired a COT in the FFP in the corresponding LBT bandwidth. Conversely, if a bit corresponding to an LBT bandwidth is zero in the bitmap 702, the bit indicates that the BS 105 did not acquire a COT in the FFP in the corresponding LBT bandwidth. In other words, the BS 105 passed LBT in the LBT bandwidths corresponding to bits having a one value and failed LBT in the LBT bandwidths corresponding to bits having a zero value. These are merely examples, it should be understood that in other examples, a bit value of one may indicate that the BS 105 did not acquire a COT in the FFP in the corresponding LBT bandwidth and a bit value of zero may indicate that the BS 105 acquired a COT in the FFP in the corresponding LBT bandwidth.

The bit value stored in the bitmap 702 may apply until the end of the COT corresponding to the LBT bandwidth. Given the different FFP offsets at different locations, the different bits in the bitmap 702 may have different effective ending points in time (e.g., the end of the FFP for the LBT bandwidth). Regarding a first entry 704 in the bitmap 702, the BS 105 may acquire a COT $416_a$ in the FFP $414_a$ (due to an LBT pass) in the LBT bandwidth 212. An ending point of the COT 416$_a$ is at time T0. Accordingly, the first entry 704 may store a bit having a value of one, which indicates that the ending point of the COT 416$_a$ or the FFP 414$_a$ is at time T0. Regarding a second entry 706 in the bitmap 702, the BS 105 may be unable to acquire a COT 426$_a$ in the FFP 424$_a$ (due to an LBT fail) in the LBT bandwidth 210. Accordingly, the second entry 706 may store a bit having a value of zero. Regarding a third entry 708 in the bitmap 702, the BS 105 may acquire a COT 436$_a$ in the FFP 434$_a$ (due to an LBT pass) in the LBT bandwidth 208. An ending point of the COT 436$_a$ is at time T1. Accordingly, the third entry 706 may store a bit having a value of one, which indicates that the ending point of the COT 436$_a$ or the FFP 434$_a$ is at time T1. The bit stored in the first entry 704 and the bit stored in the third entry 706 correspond to different ending points of a COT in an FFP. The BS 105 may continue to insert values in the bitmap 702 accordingly and send the bitmap 702 to the UE 115.

The UE 115 may receive the bitmap 702 and determine, based on a bit value that is stored in the bitmap 702 and that corresponds to an LBT bandwidth, whether the BS 105 was able to acquire a COT in an FFP in the respective LBT bandwidth. For bit values indicating that the BS 105 was able to acquire a COT in a given LBT bandwidth, the UE 115 may monitor for UL and/or DL scheduling grants and/or may perform LBT in the given LBT bandwidth based on the BS 105's indication that the UE 115 may share the COT acquired by the BS 105 in the respective LBT bandwidth, as discussed above. In an example, the UE 115 may receive a DL grant, and the UE 115 may receive a DL communication based on the DL grant from the BS 105. In another example, the UE 115 may receive an UL grant, and the UE 115 may perform LBT and transmit an UL communication based on an LBT pass. In another example, the BS 105 indicates that the UE 115 may share the COT, and the UE 115 performs LBT and transmits an UL communication based on an LBT pass.

It should be understood that an FBE scheme may include aspects of the FBE scheme 200 in FIG. 2, the FBE scheme 300 in FIG. 3, the FBE scheme 400 in FIG. 4, the FBE scheme 500 in FIG. 5, the FBE scheme 600 in FIG. 6, and/or the FBE scheme 700 in FIG. 7. For example, an FBE scheme may implement the "all or nothing" approach discussed in relation to the FBE 300 and use a bitmap 702 to indicate whether the BS 105 acquired a COT across a plurality of LBT bandwidths. Other combinations of these FBE schemes are within the scope of the present disclosure.

Figure 8:
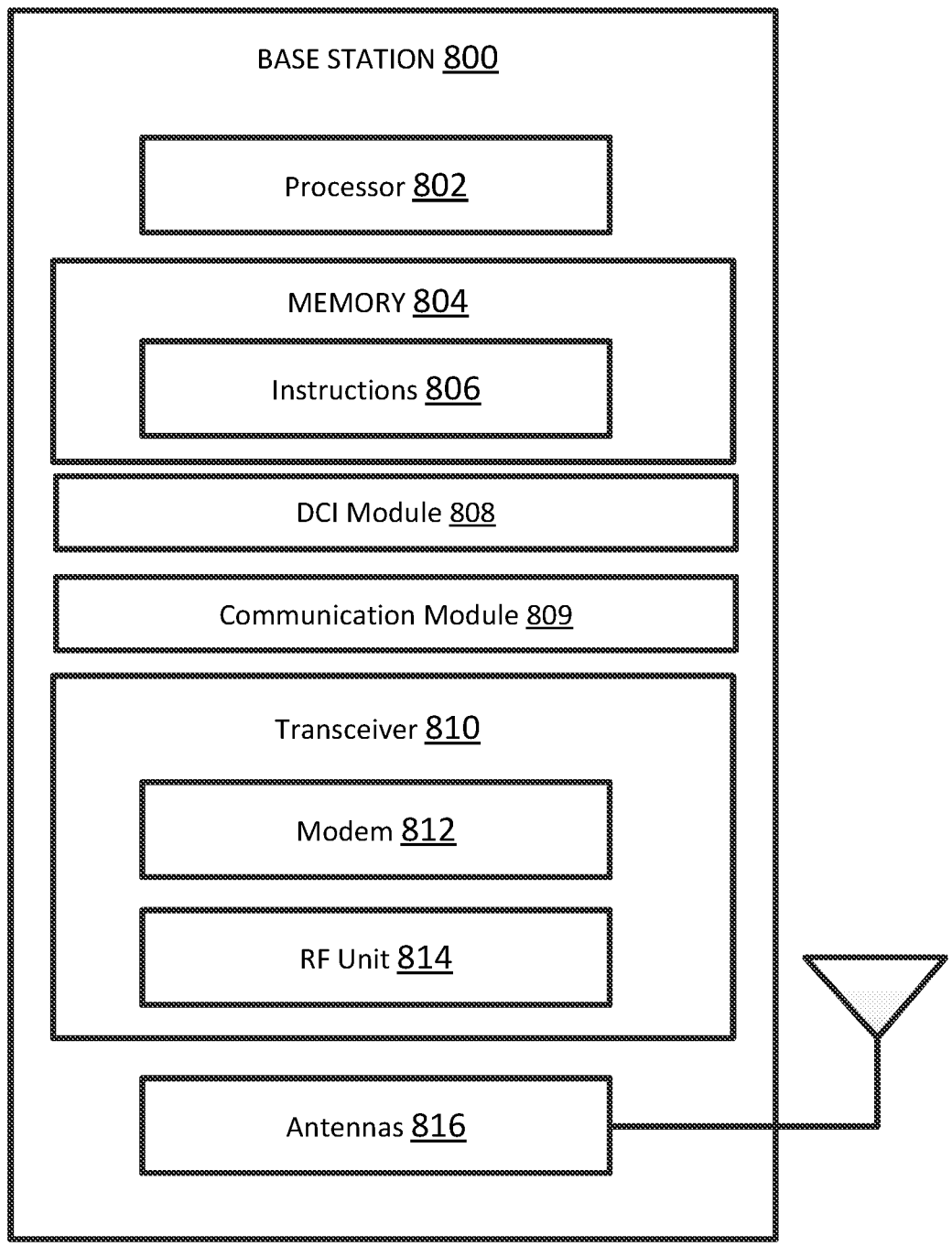
FIG. 8 is a block diagram of a BS according to one or more aspects of the present disclosure.

FIG. 8 is a block diagram of a BS 800 according to one or more aspects of the present disclosure. The BS 800 may be a BS 105 as discussed in relation to FIG. 1. As shown, the BS 800 may include a processor 802, a memory 804, a DCI module 808, a communication module 809, a transceiver 810 including a modem subsystem 812 and an RF unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some aspects, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the BSs in connection with aspects of the present disclosure, for example, aspects of FIGS. 1-7 and 10-12. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The DCI module 808 and/or the communication module 809 may be implemented via hardware, software, or combinations thereof. The DCI module 808 and/or the communication module 809 may be implemented as a processor, circuit, and/or instructions 806 stored in the memory 804 and executed by the processor 802. In some instances, the DCI module 808 and/or the communication module 809 can be integrated within the modem subsystem 812. The DCI module 808 and/or the communication module 809 can be implemented by a combination of software components (e.g., executed by a DSP or a general processor) and hardware components (e.g., logic gates and circuitry) within the modem subsystem 812. The DCI module 808 and/or the communication module 809 may be used for various aspects of the present disclosure, for example, aspects of FIGS. 1-7 and 10-12.

In some aspects, the DCI module 808 may be configured to communicate with a second wireless communication device in each LBT bandwidth of a plurality of LBT bandwidths, DCI indicating acquisition of a COT in an FFP in the respective LBT bandwidth. In some aspects, the communication module 809 may be configured to communicate with the second wireless communication device, a communication in at least one LBT bandwidth of the plurality of LBT bandwidths during the respective COT.

In some aspects, the DCI module 808 may be configured to communicate with a second wireless communication device in an LBT bandwidth of a plurality of LBT bandwidths, DCI indicating acquisition of a COT in an FFP across the plurality of LBT bandwidths. In some aspects, the communication module 809 may be configured to communicate with the second wireless communication device, a communication in at least one LBT bandwidth of the plurality of LBT bandwidths during the respective COT.

In some aspects, the DCI module 808 may be configured to communicate with a second wireless communication device in at least one LBT bandwidth of a plurality of LBT bandwidths, DCI indicating a starting point of an FFP in the respective LBT bandwidth. In some aspects, the communication module 809 may be configured to communicate with the second wireless communication device, a communication during the respective FFP in one or more LBT bandwidths of the at least one LBT bandwidth.

As shown, the transceiver 810 may include the modem subsystem 812 and the RF unit 814. The transceiver 810 can be configured to communicate bi-directionally with other devices, such as the UEs 115 and/or another core network element. The modem subsystem 812 may be configured to modulate and/or encode data according to a modulation and coding schemes (MCS), e.g., a low density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., grants, COT-SI, structure of an FFP, DCI, UL and/or DL communication, etc.) from the modem subsystem 812 (on outbound transmissions) or of transmissions originating from another source such as a UE 115 and/or UE 900. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 or 900 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., grants, COT-SI, structure of an FFP, DCI, UL and/or DL communication, etc.) to the DCI module 808 and/or the communication module 809 for processing. The antennas 816 may include multiple antennas of similar or different designs in order to sustain multiple transmission links.

In an example, the transceiver 810 is configured to receive an UL communication signal, and transmit a DL communication signal, receive DCI, etc., by coordinating with the DCI module 808. In some aspects, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
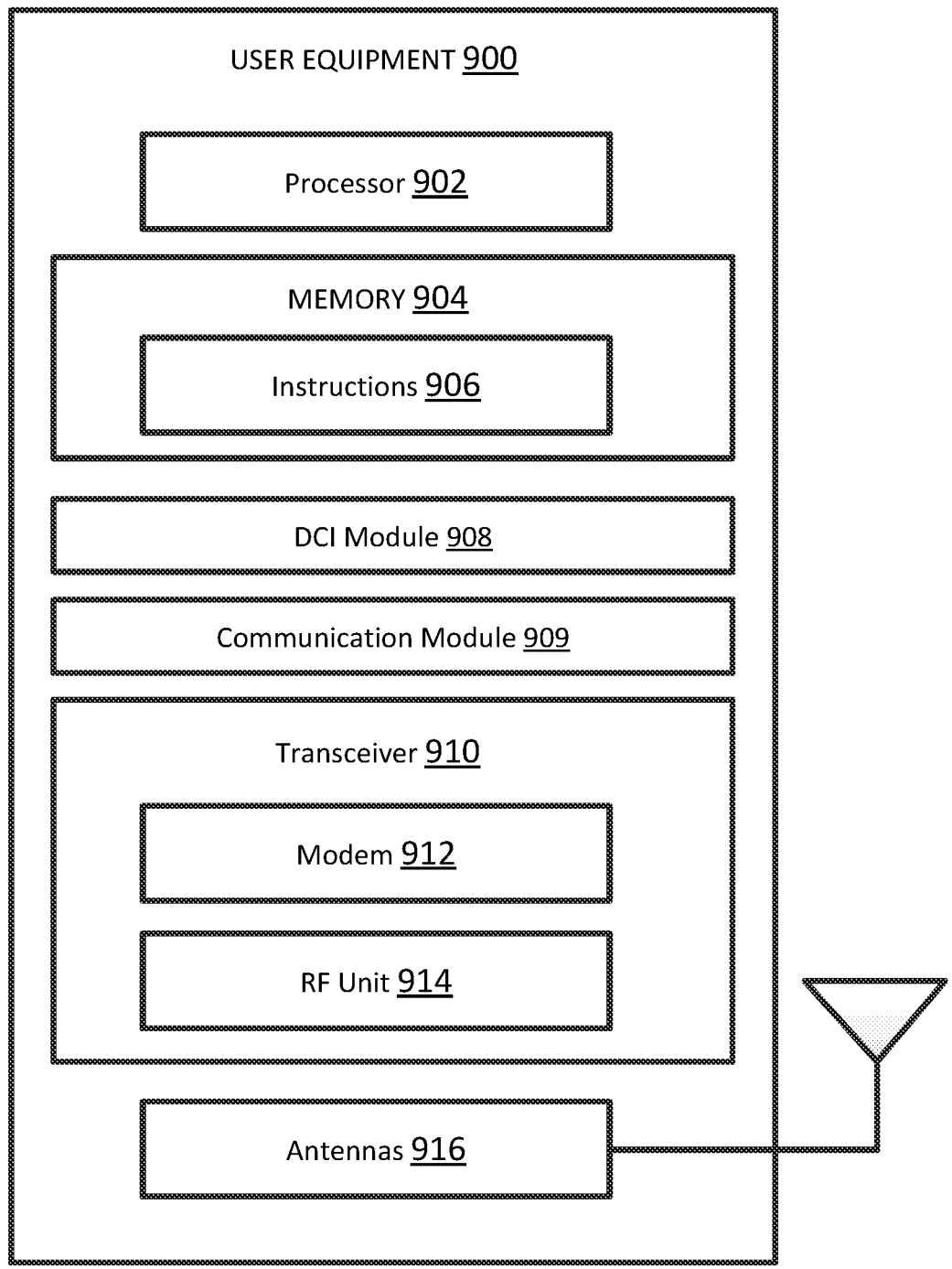
FIG. 9 is a block diagram of a user equipment (UE) according to one or more aspects of the present disclosure.

FIG. 9 is a block diagram of a UE 900 according to one or more aspects of the present disclosure. The UE 900 may be a UE 115 discussed in relation to FIG. 1. As shown, the UE 900 may include a processor 902, a memory 904, a DCI module 908, a communication module 909, a transceiver 910 including a modem subsystem 912 and a radio frequency (RF) unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 1-7 and 10-12. Instructions 906 may also be referred to as code, which may be interpreted broadly to include any type of computer-readable statement(s) as discussed above with respect to FIG. 8.

The DCI module 908 and/or the communication module 909 may be implemented via hardware, software, or combinations thereof. The DCI module 908 and/or the communication module 909 may be implemented as a processor, circuit, and/or instructions 906 stored in the memory 904 and executed by the processor 902. In some instances, the DCI module 908 and/or the communication module 909 can be integrated within the modem subsystem 912. The DCI module 908 and/or the communication module 909 can be implemented by a combination of software components (e.g., executed by a DSP or a general processor) and hardware components (e.g., logic gates and circuitry) within the modem subsystem 912. The DCI module 908 and/or the communication module 909 may be used for various aspects of the present disclosure, for example, aspects of FIGS. 1-7 and 10-12.

In some aspects, the DCI module 908 may be configured to communicate with a second wireless communication device in each LBT bandwidth of a plurality of LBT bandwidths, DCI indicating acquisition of a COT in an FFP in the respective LBT bandwidth. In some aspects, the communication module 909 may be configured to communicate with the second wireless communication device, a communication in at least one LBT bandwidth of the plurality of LBT bandwidths during the respective COT.

In some aspects, the DCI module 908 may be configured to communicate with a second wireless communication device in an LBT bandwidth of a plurality of LBT bandwidths, DCI indicating acquisition of a COT in an FFP across the plurality of LBT bandwidths. In some aspects, the communication module 909 may be configured to communicate with the second wireless communication device, a communication in at least one LBT bandwidth of the plurality of LBT bandwidths during the respective COT.

In some aspects, the DCI module 908 may be configured to communicate with a second wireless communication device in at least one LBT bandwidth of a plurality of LBT bandwidths, DCI indicating a starting point of an FFP in the respective LBT bandwidth. In some aspects, the communication module 909 may be configured to communicate with the second wireless communication device, a communication during the respective FFP in one or more LBT bandwidths of the at least one LBT bandwidth.

As shown, the transceiver 910 may include the modem subsystem 912 and the RF unit 914. The transceiver 910 can be configured to communicate bi-directionally with other devices, such as the BS 105 or the BS 800. The modem subsystem 912 may be configured to modulate and/or encode the data from the memory 904 and/or the DCI module 908 according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or the BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 900 to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., grants, COT-SI, structure of an FFP, DCI, UL and/or DL communication, etc.) to the DCI module 908 and/or the communication module 909 for processing. The antennas 916 may include multiple antennas of similar or different designs in order to sustain multiple transmission links. The RF unit 914 may configure the antennas 916.

In some aspects, the transceiver 910 is configured to transmit an UL communication, receive COT-SI and/or the structure of an FFP, receive a DL communication from a BS, transmit an UL communication to the BS, receive DCI, etc. by coordinating with the DCI module 908 and/or the communication module 909. In some aspects, the UE 900 can include multiple transceivers 910 implementing different radio access technologies (RATs) (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
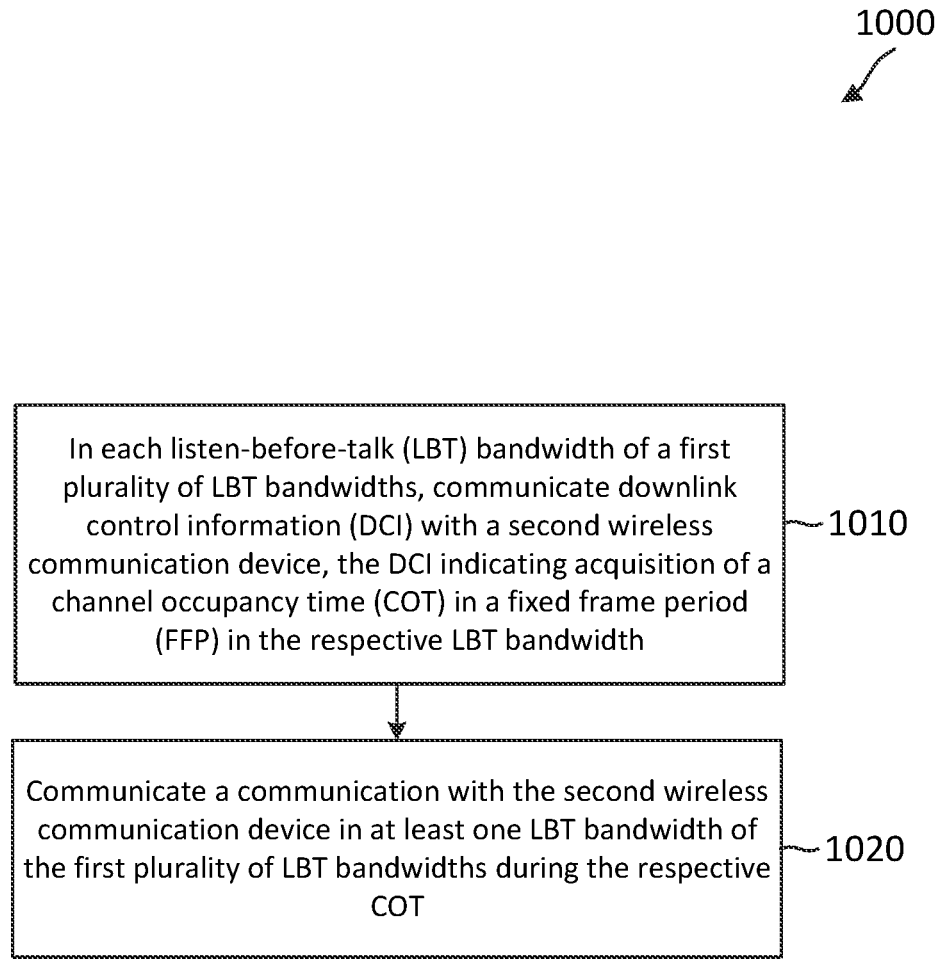
FIG. 10 is a flow diagram of a communication method according to one or more aspects of the present disclosure.

FIG. 10 is a flow diagram of a communication method 1000 according to one or more aspects of the present disclosure. Blocks of the method 1000 can be executed by a computing device (e.g., a processor, processing circuit, and/or other suitable component) of a wireless communication device or other suitable means for executing the blocks. For example, a wireless communication device, such as the BS 105 and/or BS 800 may utilize one or more components, such as the processor 802 the memory 804, the DCI module 808, the communication module 809, the transceiver 810, the modem 812, the RF unit 814, and the one or more antennas 816 to execute the blocks of method 1000. In another example, a wireless communication device, such as the UE 115 and/or the UE 900 may utilize one or more components, such as the processor 902, the memory 904, the DCI module 908, the communication module 909, the transceiver 910, the modem 912, the RF unit 914, and the one or more antennas 916 to execute the blocks of method 1000. The method 1000 may employ similar mechanisms as in the FBE scheme 200, the FBE scheme 300, the FBE scheme 400, the FBE scheme 500, the FBE scheme 600, and/or the FBE scheme 700 described above with respect to FIGS. 2, 3, 4, 5, 6, and 7, respectively. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, the method 1000 includes in each LBT bandwidth of a plurality of LBT bandwidths, communicating DCI with a second wireless communication device, the DCI indicating acquisition of a COT in an FFP in the respective LBT bandwidth. In certain implementations, a plurality of LBT bandwidths may include three or more LBT bandwidths. Each FFP in the plurality of LBT bandwidths may be aligned. Additionally, the DCI may include a DCI format 2_0.

At block 1020, the method 1000 includes communicating a communication with the second wireless communication device in at least one LBT bandwidth of the plurality of LBT bandwidths during the respective COT.

In some aspects, the first wireless communication device includes a BS 105, and the second wireless communication device includes a UE 115. The BS 105 may perform an LBT in each LBT bandwidth of the plurality of LBT bandwidths, where an LBT results in an LBT pass for each LBT bandwidth of the plurality of LBT bandwidths. Additionally, the BS 105 may communicate in each LBT bandwidth of the plurality of LBT bandwidths by transmitting in each LBT bandwidth of the plurality of LBT bandwidths DCI indicating that the BS has acquired the COT in the respective LBT bandwidth. The BS 105 may communicate the communication by receiving an UL communication from the UE 115. The BS 105 may perform an LBT in each LBT bandwidth of a set of LBT bandwidths different from the plurality of LBT bandwidths, where an LBT results in an LBT fail for each of the set of LBT bandwidths. Accordingly, the BS 105 does not acquire a COT in the set of LBT bandwidths based on the LBT fail.

In some aspects, the first wireless communication device includes a UE 115, and the second wireless communication device includes a BS 105. The UE 115 may monitor for PDCCH in the plurality of LBT bandwidths. Additionally, the UE 115 may communicate in each LBT bandwidth by detecting in each LBT bandwidth of the plurality of LBT bandwidths DCI indicating that the BS has acquired the COT in the respective LBT bandwidth. The UE 115 may perform an LBT in at least one LBT bandwidth of the plurality of LBT bandwidths, where an LBT results in an LBT pass for each of the respective LBT bandwidths. Additionally, the UE 115 may communicate the communication by transmitting an UL communication to the BS 105 105.

Figure 11:
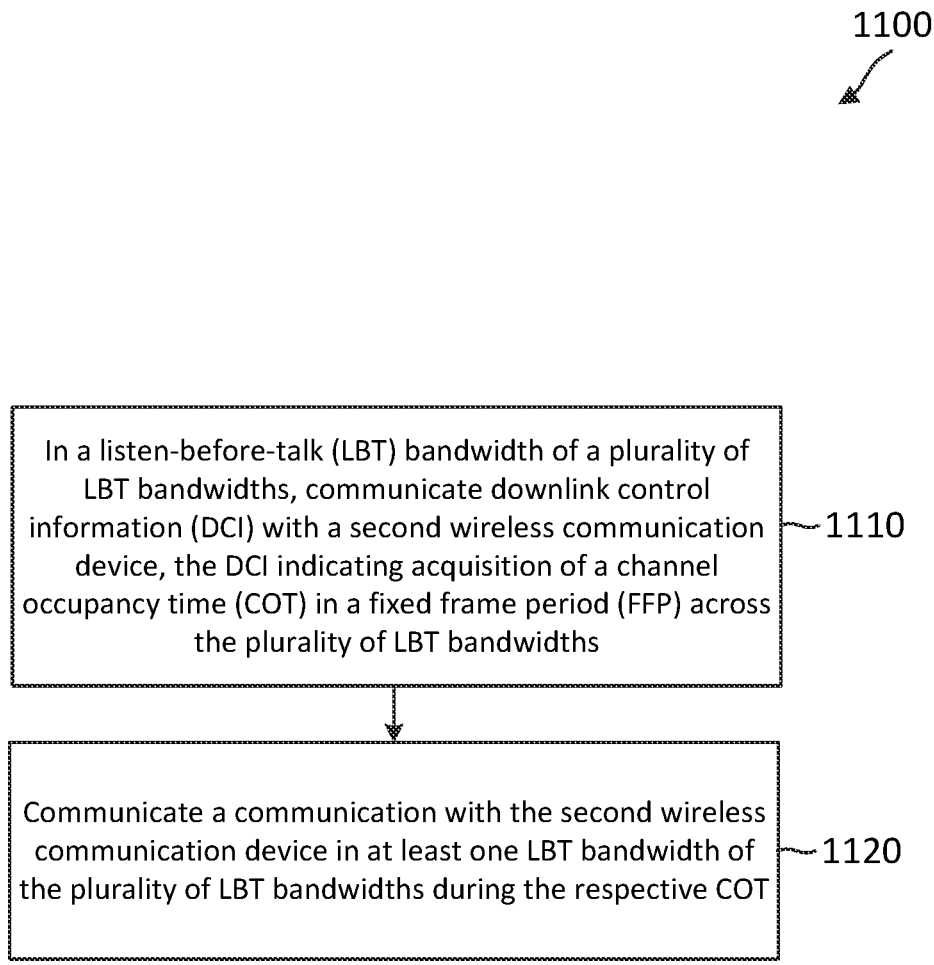
FIG. 11 is a flow diagram of a communication method according to one or more aspects of the present disclosure.

FIG. 11 is a flow diagram of a communication method 1100 according to one or more aspects of the present disclosure. Blocks of the method 1100 can be executed by a computing device (e.g., a processor, processing circuit, and/or other suitable component) of a wireless communication device or other suitable means for executing the blocks. For example, a wireless communication device, such as the BS 115 and/or BS 800 may utilize one or more components, such as the processor 802 the memory 804, the DCI module 808, the communication module 809, the transceiver 810, the modem 812, the RF unit 814, and the one or more antennas 816 to execute the blocks of method 1100. In another example, a wireless communication device, such as the UE 115 and/or the UE 900 may utilize one or more components, such as the processor 902, the memory 904, the DCI module 908, the communication module 909, the transceiver 910, the modem 912, the RF unit 914, and the one or more antennas 916 to execute the blocks of method 1100. The method 1100 may employ similar mechanisms as in the FBE scheme 200, the FBE scheme 300, the FBE scheme 400, the FBE scheme 500, the FBE scheme 600, and/or the FBE scheme 700 described above with respect to FIGS. 2, 3, 4, 5, 6, and 7, respectively. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1110, the method 1100 includes in an LBT bandwidth of a plurality of LBT bandwidths, communicating DCI with a second wireless communication device, the DCI indicating acquisition of a COT in an FFP across the plurality of LBT bandwidths. The plurality of LBT bandwidths may include at least three LBT bandwidths. The DCI may include a DCI format 2_0.

At block 1120, the method 1100 includes communicating a communication with the second wireless communication device in at least one LBT bandwidth of the plurality of LBT bandwidths during the respective COT.

In some aspects, the first wireless communication device includes a BS 105, and the second wireless communication device includes a UE 115. The BS 105 may perform an LBT in each LBT bandwidth of the plurality of LBT bandwidths, where an LBT results in an LBT pass for each LBT bandwidth of the plurality of LBT bandwidths. The BS 105 may communicate in the LBT bandwidth by transmitting in the LBT bandwidth DCI indicating that the BS has acquired the COT in the FFP across the plurality of LBT bandwidths. The BS 105 may communicate the communication by receiving an UL communication from the UE 115.

In some aspects, the first wireless communication device includes a UE 115, and the second wireless communication device includes a BS 105. The UE 115 may monitor for PDCCH in the plurality of LBT bandwidths. The UE 115 may communicate in the LBT bandwidth by receiving in the LBT bandwidth DCI indicating that the BS has acquired the COT in the FFP across the plurality of LBT bandwidths. The UE 115 may perform an LBT in at least one LBT bandwidth of the plurality of LBT bandwidths, where an LBT results in an LBT pass for each of the respective LBT bandwidths. The UE 115 may communicate the communication by transmitting an UL communication to the BS 105.

Figure 12:
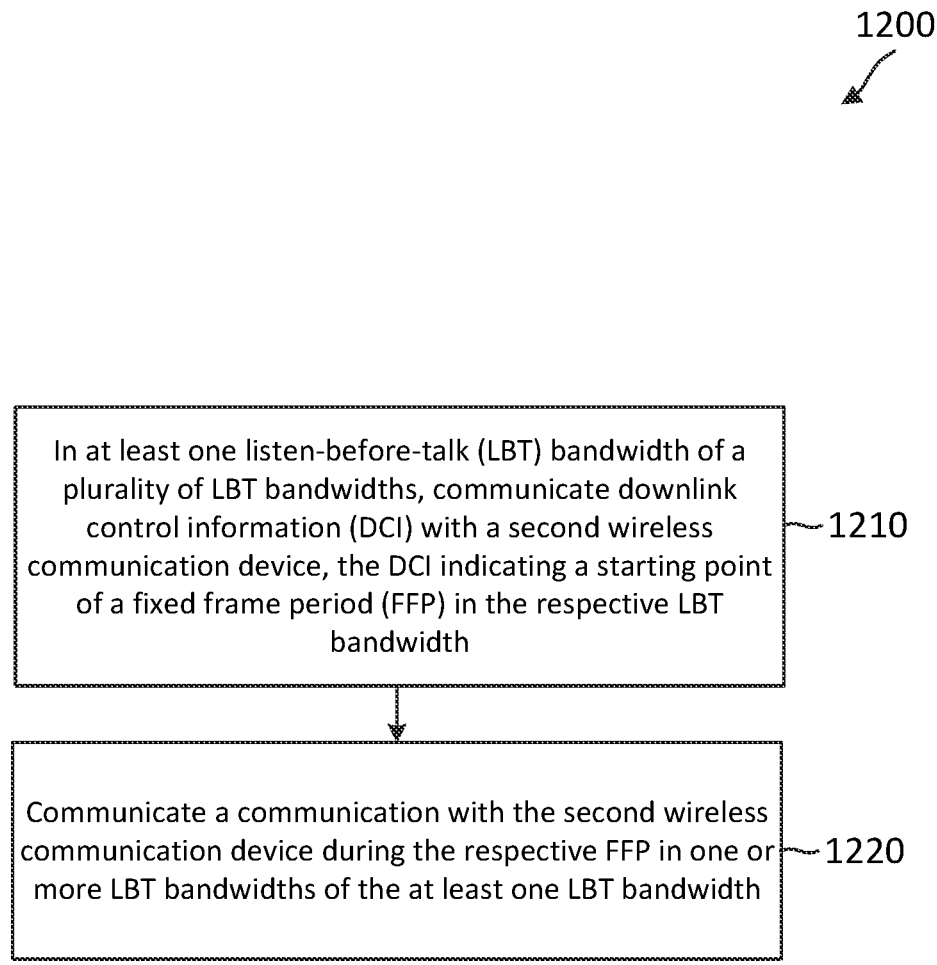
FIG. 12 is a flow diagram of a communication method according to one or more aspects of the present disclosure.

FIG. 12 is a flow diagram of a communication method 1200 according to one or more aspects of the present disclosure. Blocks of the method 1200 can be executed by a computing device (e.g., a processor, processing circuit, and/or other suitable component) of a wireless communication device or other suitable means for executing the blocks. For example, a wireless communication device, such as the BS 125 and/or BS 800 may utilize one or more components, such as the processor 802 the memory 804, the DCI module 808, the communication module 809, the transceiver 810, the modem 812, the RF unit 814, and the one or more antennas 816 to execute the blocks of method 1200. In another example, a wireless communication device, such as the UE 125 and/or the UE 900 may utilize one or more components, such as the processor 902, the memory 904, the DCI module 908, the communication module 909, the transceiver 910, the modem 912, the RF unit 914, and the one or more antennas 916 to execute the blocks of method 1200. The method 1200 may employ similar mechanisms as in the FBE scheme 200, the FBE scheme 300, the FBE scheme 400, the FBE scheme 500, the FBE scheme 600, and/or the FBE scheme 700 described above with respect to FIGS. 2, 3, 4, 5, 6, and 7, respectively. As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1210, the method 1200 includes in at least one LBT bandwidth of a plurality of LBT bandwidths, communicating DCI with a second wireless communication device, the DCI indicating a starting point of an FFP in the respective LBT bandwidth. The first wireless communication device may communicate the DCI based on a frequency resource associated with the starting point of the FFP in the respective LBT bandwidth. Each FFP included in the plurality of LBT bandwidths may be misaligned relative to each other. The DCI may include a DCI format 2_0. In some aspects, the DCI may include a bitmap, and each bit included in the bitmap may indicate whether a COT is acquired in an FFP in the respective LBT bandwidth of the plurality of LBT bandwidths. Each bit included in the bitmap may correspond to a different ending position of the FFP in the respective LBT bandwidth.

At block 1220, the method 1200 includes communicating a communication with the second wireless communication device during the respective FFP in one or more LBT bandwidths of the at least one LBT bandwidth. The first wireless communication device may communicate the DCI by communicating DCI in the plurality of LBT bandwidths. In some aspects, the plurality of LBT bandwidths includes a first set of LBT bandwidths and a second set of LBT bandwidths. The first set of LBT bandwidths may include FFPs starting at a first starting point, and the second set of LBT bandwidths may include FFPs starting at a second starting point. The first wireless communication device may communicate DCI by communicating a first DCI in one LBT bandwidth of the first set and communicating a second DCI in one LBT bandwidth of the second set. The first DCI may indicate the first starting point of FFPs across the first set of LBT bandwidths, and the second DCI may indicate the second starting point of FFPs across the second set of LBT bandwidths.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

The invention claimed is:

1. A method of wireless communication performed by a first wireless communication device, the method comprising:
    communicating a plurality of downlink control information (DCI) with a second wireless communication device, including a respective DCI of the plurality of DCI in each listen-before-talk (LBT) bandwidth of a plurality of LBT bandwidths, the respective DCI indicating acquisition of a channel occupancy time (COT) in a fixed frame period (FFP) in the respective LBT bandwidth, wherein each FFP in the plurality of LBT bandwidths is aligned; and
    communicating a communication with the second wireless communication device in at least one LBT bandwidth of the plurality of LBT bandwidths during the respective COT.

2. The method of claim 1, wherein the plurality of LBT bandwidths includes at least three LBT bandwidths.

3. The method of claim 1, wherein the first wireless communication device comprises a base station (BS), and the second wireless communication device comprises a user equipment (UE), the method further comprising:
    performing, by the BS, an LBT in each LBT bandwidth of the plurality of LBT bandwidths, wherein the LBT results in an LBT pass for each LBT bandwidth of the plurality of LBT bandwidths,
    wherein communicating in each LBT bandwidth of the plurality of LBT bandwidths includes transmitting in each LBT bandwidth of the plurality of LBT bandwidths the respective DCI indicating that the BS has acquired the COT in the respective LBT bandwidth.

4. The method of claim 3, wherein communicating the communication includes receiving an uplink (UL) communication from the UE.

5. The method of claim 1, wherein the plurality of DCI comprises a DCI format 2_0.

6. A method of wireless communication performed by a base station (BS), the method comprising:
    performing, by the BS, an LBT in each LBT bandwidth of the plurality of LBT bandwidths, wherein the LBT results in an LBT pass for each LBT bandwidth of the plurality of LBT bandwidths;
    communicating a plurality of downlink control information (DCI) with a user equipment (UE), including a respective DCI of the plurality of DCI in each listen-before-talk (LBT) bandwidth of a plurality of LBT bandwidths, the respective DCI indicating acquisition of a channel occupancy time (COT) in a fixed frame period (FFP) in the respective LBT bandwidth,
    wherein communicating in each LBT bandwidth of the plurality of LBT bandwidths includes transmitting in each LBT bandwidth of the plurality of LBT bandwidths the respective DCI indicating that the BS has acquired the COT in the respective LBT bandwidth; and
    communicating a communication with the UE in at least one LBT bandwidth of the plurality of LBT bandwidths during the respective COT; and
    performing, by the BS, an LBT in each LBT bandwidth of a set of LBT bandwidths different from the plurality of LBT bandwidths, wherein an LBT results in an LBT fail for each of the set of LBT bandwidths.

7. A method of wireless communication performed by a user equipment (UE), the method comprising:
    communicating a plurality of downlink control information (DCI) with a base station (BS), including a respective DCI of the plurality of DCI in each listen-before-talk (LBT) bandwidth of a plurality of LBT bandwidths, the respective DCI indicating acquisition of a channel occupancy time (COT) in a fixed frame period (FFP) in the respective LBT bandwidth, wherein each FFP in the plurality of LBT bandwidths is aligned;
    communicating a communication with the BS in at least one LBT bandwidth of the plurality of LBT bandwidths during the respective COT; and
    monitoring, by the UE, for a physical downlink control channel (PDCCH) in the plurality of LBT bandwidths, wherein communicating in each LBT bandwidth includes detecting in each LBT bandwidth of the plurality of LBT bandwidths the respective DCI indicating that the BS has acquired the COT in the respective LBT bandwidth.

8. The method of claim 7, further comprising:
    performing, by the UE, an LBT in the at least one LBT bandwidth of the plurality of LBT bandwidths, wherein the LBT results in an LBT pass for each of the at least one LBT bandwidth, and wherein communicating the communication includes transmitting an UL communication to the BS.

9. An apparatus, comprising:
    a memory;
    a transceiver; and
    at least one processor coupled to the memory and the transceiver, wherein the apparatus is configured to:
    communicate, with a second wireless communication device in each listen-before-talk (LBT) bandwidth of a plurality of LBT bandwidths, a respective downlink control information (DCI) of a plurality of DCI indicating acquisition of a channel occupancy time (COT) in a fixed frame period (FFP) in the respective LBT bandwidth, wherein each FFP in the plurality of LBT bandwidths is aligned; and communicate, with the second wireless communication device, a communication in at least one LBT bandwidth of the plurality of LBT bandwidths during the respective COT.

10. The apparatus of claim 9, wherein the plurality of LBT bandwidths includes at least three LBT bandwidths.

11. The apparatus of claim 9, wherein the apparatus comprises a base station (BS), and the second wireless communication device comprises a user equipment (UE), the apparatus further configured to:

perform an LBT in each LBT bandwidth of the plurality of LBT bandwidths, wherein the LBT results in an LBT pass for each LBT bandwidth of the plurality of LBT bandwidths; and communicate in each LBT bandwidth of the plurality of LBT bandwidths by transmitting in each LBT bandwidth of the plurality of LBT bandwidths the respective DCI indicating that the BS has acquired the COT in the respective LBT bandwidth.

12. The apparatus of claim 11, wherein the apparatus is further configured to communicate the communication by receiving an uplink (UL) communication from the UE.

13. The apparatus of claim 9, wherein the apparatus comprises a user equipment (UE), and the second wireless communication device comprises a base station (BS), the apparatus further configured to:

monitor for a physical downlink control channel (PDCCH) in the plurality of LBT bandwidths; and communicate in each LBT bandwidth by detecting in each LBT bandwidth of the plurality of LBT bandwidths the respective DCI indicating that the BS has acquired the COT in the respective LBT bandwidth.

14. The apparatus of claim 9, wherein the plurality of DCI comprises a DCI format 2_0.

15. A base station (BS) comprising:

a memory;

a transceiver; and at least one processor coupled to the memory and the transceiver, wherein the BS is configured to:

perform an LBT in each LBT bandwidth of the plurality of LBT bandwidths, wherein the LBT results in an LBT pass for each LBT bandwidth of the plurality of LBT bandwidths;

communicate, with a user equipment (UE) in each listen-before-talk (LBT) bandwidth of a plurality of LBT bandwidths, a respective downlink control information (DCI) of a plurality of DCI indicating acquisition of a channel occupancy time (COT) in a fixed frame period (FFP) in the respective LBT bandwidth, wherein the BS is configured to communicate in each LBT bandwidth of the plurality of LBT bandwidths by transmitting in each LBT bandwidth of the plurality of LBT bandwidths the respective DCI indicating that the BS has acquired the COT in the respective LBT bandwidth; and communicate, with the UE, a communication in at least one LBT bandwidth of the plurality of LBT bandwidths during the respective COT; and wherein the BS is further configured to perform an LBT in each LBT bandwidth of a set of LBT bandwidths different from the plurality of LBT bandwidths, wherein the LBT results in an LBT fail for each of the set of LBT bandwidths.

16. A user equipment (UE), comprising:

a memory;

a transceiver; and at least one processor coupled to the memory and the transceiver, wherein the UE is configured to:

communicate, with a BS in each listen-before-talk (LBT) bandwidth of a plurality of LBT bandwidths, a respective downlink control information (DCI) of a plurality of DCI indicating acquisition of a channel occupancy time (COT) in a fixed frame period (FFP) in the respective LBT bandwidth; and communicate, with the BS, a communication in at least one LBT bandwidth of the plurality of LBT bandwidths during the respective COT;

wherein the apparatus is further configured to:

monitor for a physical downlink control channel (PDCCH) in the plurality of LBT bandwidths;

communicate in each LBT bandwidth by detecting in each LBT bandwidth of the plurality of LBT bandwidths the respective DCI indicating that the BS has acquired the COT in the respective LBT bandwidth;

perform an LBT in the at least one LBT bandwidth of the plurality of LBT bandwidths, wherein the LBT results in an LBT pass for each of the at least one LBT bandwidth; and communicate the communication by transmitting an UL communication to the BS.

* * * * *